United States Patent
MacBeth et al.

(10) Patent No.: US 10,489,749 B2
(45) Date of Patent: Nov. 26, 2019

(54) PRESENTING DAILY TASK LISTS

(75) Inventors: Melissa MacBeth, Seattle, WA (US);
Derek Leung, Redmond, WA (US);
Richard H. Leukart, III, Los Angeles, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1515 days.

(21) Appl. No.: 11/600,324

(22) Filed: Nov. 14, 2006

(65) Prior Publication Data

US 2008/0114809 A1    May 15, 2008

(51) Int. Cl.
*G06Q 10/10*    (2012.01)

(52) U.S. Cl.
CPC ....... *G06Q 10/109* (2013.01); *G06Q 10/1093* (2013.01); *G06Q 10/1095* (2013.01); *G06Q 10/1097* (2013.01)

(58) Field of Classification Search
CPC .. G06Q 10/109; G06Q 10/10; G06Q 10/1097; G06Q 10/06311; G06Q 10/1093; G06Q 10/0631; G06Q 10/06313; G06Q 10/06314; G06Q 10/06316; G06Q 10/107; G06Q 10/1095
USPC .......... 705/7.16, 7.18, 7.19, 7.21, 7.22, 7.24
See application file for complete search history.

(56) References Cited

U.S. PATENT DOCUMENTS

| | | | | |
|---|---|---|---|---|
| 5,063,600 A | * | 11/1991 | Norwood | G06F 3/033 345/173 |
| 5,247,438 A | * | 9/1993 | Subas et al. | 700/90 |
| 5,433,546 A | * | 7/1995 | Kershaw | 402/79 |
| 5,457,476 A | * | 10/1995 | Jenson | 715/823 |
| 5,528,745 A | * | 6/1996 | King et al. | 715/753 |
| 5,530,861 A | | 6/1996 | Diamant et al. | 395/650 |
| 5,570,109 A | * | 10/1996 | Jenson | G06F 3/0488 715/823 |
| 5,689,687 A | * | 11/1997 | Nishioka | 345/556 |
| 5,745,110 A | * | 4/1998 | Ertemalp | 715/764 |
| 5,825,360 A | * | 10/1998 | Odam et al. | 715/807 |
| 5,873,095 A | * | 2/1999 | Gore | |
| 5,884,306 A | * | 3/1999 | Bliss et al. | |
| 5,898,434 A | * | 4/1999 | Small et al. | 715/810 |
| 5,900,870 A | * | 5/1999 | Malone et al. | 715/866 |

(Continued)

OTHER PUBLICATIONS

Commtouch Launches Premier Email and Calendaring Services for About.com; Web's No. 1 Information Site Showcases New Calendaring Technologies From Commtouch. Business Wire. Nov. 10, 1999: 0033.*

(Continued)

*Primary Examiner* — Timothy Padot

(57) ABSTRACT

A range of dates is selected. For each date of the range of dates, a daily task list is displayed listing at least a portion of tasks having a start date or a due date matching the date. A user selection determines whether the daily task list includes only tasks having the start date or the due date for each date in the range of dates, or includes any task completed on each date. Appointments for each date in the range of dates may be presented, and the daily task list for each date may be displayed beneath, above, or alongside the appointments, or as part of a to do list. The tasks each may be assigned a color code allowing a task to be visually associated with another task or other object to which the color code also has been assigned.

20 Claims, 29 Drawing Sheets

(56) References Cited

U.S. PATENT DOCUMENTS

| | | | | |
|---|---|---|---|---|
| 6,039,355 | A * | 3/2000 | Durand | 283/2 |
| 6,047,260 | A * | 4/2000 | Levinson | 705/7.15 |
| 6,065,012 | A * | 5/2000 | Balsara et al. | |
| 6,101,513 | A * | 8/2000 | Shakib et al. | 715/234 |
| 6,381,580 | B1 * | 4/2002 | Levinson | 705/7.13 |
| 6,442,527 | B1 * | 8/2002 | Worthington | 705/7.19 |
| 6,546,417 | B1 * | 4/2003 | Baker | 709/206 |
| 6,708,202 | B1 * | 3/2004 | Shuman et al. | 709/206 |
| 6,748,582 | B1 * | 6/2004 | Chiles et al. | 717/111 |
| 6,839,669 | B1 * | 1/2005 | Gould et al. | 704/246 |
| 6,901,398 | B1 * | 5/2005 | Horvitz et al. | 709/207 |
| 6,907,582 | B2 * | 6/2005 | Stanley | 715/866 |
| 7,092,934 | B1 * | 8/2006 | Mahan et al. | |
| 7,103,559 | B2 * | 9/2006 | Worthington | 705/7.19 |
| 7,188,073 | B1 * | 3/2007 | Tam et al. | 705/7.16 |
| 7,209,888 | B2 * | 4/2007 | Frid-Nielsen et al. | 705/7.13 |
| 7,245,483 | B2 * | 7/2007 | Feague et al. | 361/679.3 |
| 7,293,013 | B1 * | 11/2007 | Horvitz et al. | 707/694 |
| 7,299,240 | B1 * | 11/2007 | Crozier | |
| 7,353,465 | B2 * | 4/2008 | Callaway et al. | 705/7.13 |
| 7,370,282 | B2 * | 5/2008 | Cary | 715/772 |
| 7,712,049 | B2 * | 5/2010 | Williams et al. | 715/834 |
| 7,747,966 | B2 * | 6/2010 | Leukart et al. | 715/792 |
| 7,788,589 | B2 * | 8/2010 | Frankel et al. | 715/752 |
| 7,814,055 | B2 * | 10/2010 | Hullot et al. | 707/628 |
| 7,822,713 | B2 * | 10/2010 | Hullot et al. | 707/628 |
| 2002/0131572 | A1 * | 9/2002 | Paradis | 379/200 |
| 2002/0191035 | A1 * | 12/2002 | Selent | 345/866 |
| 2003/0046134 | A1 * | 3/2003 | Frolick et al. | 705/8 |
| 2003/0067491 | A1 | 4/2003 | Cadwallader | 345/779 |
| 2003/0120717 | A1 * | 6/2003 | Callaway et al. | 709/201 |
| 2003/0129569 | A1 * | 7/2003 | Callaway et al. | 434/108 |
| 2003/0233419 | A1 * | 12/2003 | Beringer | 709/206 |
| 2004/0039629 | A1 * | 2/2004 | Hoffman | G06Q 10/08 705/313 |
| 2004/0109025 | A1 * | 6/2004 | Hullot | G06Q 10/107 715/764 |
| 2004/0139435 | A1 * | 7/2004 | Cui et al. | 718/100 |
| 2004/0155452 | A1 * | 8/2004 | Sfassie | 283/38 |
| 2005/0005235 | A1 * | 1/2005 | Satterfield et al. | 715/519 |
| 2005/0005249 | A1 * | 1/2005 | Hill et al. | 715/963 |
| 2005/0013104 | A1 * | 1/2005 | Feague et al. | 361/683 |
| 2005/0108253 | A1 * | 5/2005 | Metsatahti et al. | 707/100 |
| 2005/0183026 | A1 * | 8/2005 | Amano et al. | 715/764 |
| 2005/0192822 | A1 * | 9/2005 | Hartenstein et al. | 705/1 |
| 2005/0222971 | A1 * | 10/2005 | Cary | 707/1 |
| 2006/0041460 | A1 * | 2/2006 | Aaron | 705/8 |
| 2006/0069604 | A1 * | 3/2006 | Leukart et al. | 705/9 |
| 2006/0074844 | A1 * | 4/2006 | Frankel et al. | 707/1 |
| 2006/0101350 | A1 * | 5/2006 | Scott | 715/779 |
| 2006/0203620 | A1 | 9/2006 | Bedingfield, Sr. | 368/247 |
| 2007/0174100 | A1 * | 7/2007 | Roy | 705/8 |
| 2007/0219842 | A1 * | 9/2007 | Bansal | G06Q 10/06 715/810 |
| 2007/0250784 | A1 * | 10/2007 | Riley et al. | 715/764 |
| 2008/0115088 | A1 * | 5/2008 | Frankel et al. | 715/835 |
| 2010/0223575 | A1 * | 9/2010 | Leukart et al. | 715/779 |

OTHER PUBLICATIONS

What a To-Do: Studies of Task Management Towards the Design of a Personal Task List Manager http://delivery.acm.org/10.1145/990000/985785/p735-bellotti.pdf?key1=985785&key2=5537421611&coll=GUIDE&dl=GUIDE&CFID=3793117&CFTOKEN=71477922, *CHI 2004,* Apr. 24-29, 2004, pp. 735-742.

Claris Organizer, http://www.csc.calpoly.edu/~gfisher/classes/308/examples/milestone2/claris-review.html, (last accessed Oct. 19, 2006), 2 pgs.

Task List Search, http://task-list.qarchive.org/downloads.html, (last accessed Oct. 19, 2006), 3 pgs.

* cited by examiner

PRESENTING DAILY TASK LISTS

BACKGROUND

Keeping track of appointments, things that need to be done, and other information has always presented a challenge. This is perhaps acutely true for people today. For example, each day a person who uses a networked computer in a business environment will receive countless e-mails, schedule several appointments, monitor many ongoing projects, manage numerous deadlines, and log countless new assignments. At the same time, that person will have to work to try to coordinate which individuals or groups (and their addresses and phone numbers) are associated with the appointments and assignments, which e-mails relate to which projects and assignments, and keep track of other relationships within the flood of information. At the same time, that person must try to ensure that every project and assignment is completed on time. Managing this information is a daunting task.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to computer-implemented methods, computer-readable media and a user interface for improving the managing of information. Specifically, information relating to tasks that are associated with one or more dates is collected in one or more daily task lists. In one implementation, the daily task list for one or more dates is presented by itself. In another implementation, the daily task list for one or more dates is presented together with schedules of appointments for those dates. Tasks become associated with a date, for example, because a task has been assigned that date as a start date or as a due date. Thus, in a single view of a display or a printed representation, a user can view the appointments and tasks associated with each date presented. In addition, by assigning color codes to one or more tasks, a user can visually depict a topic with which the task is associated and/or other tasks also associated with that topic, allowing the user to later view the topical association of a task and/or the association between related tasks, appointments, and other objects that might be displayed.

In one implementation of a computer-implemented method, a range of dates is selected for which tasks are to be displayed. For each date of the range of dates, a daily task list is displayed listing at least a portion of tasks having a start date or a due date matching the date. A user selection may determine whether the daily task list includes only tasks having the start date or the due date for each date in the range of dates. A user selection also specifies whether any tasks marked as having been completed on each date of the range of dates are displayed.

Additionally, schedules of appointments for the range of dates may be displayed, and the daily task list for each date may be displayed beneath, above, or alongside the schedule of appointments. Also, the daily task list may be displayed as part of a to do list in which each of the daily task lists is presented under a heading listing the respective date with which the list is associated. The to do list may include a list of undated tasks that have not been assigned either a start date or a due date. The daily task list may be included in a task bar the user can size to adjust display room available to display the daily task list. The task bar also may be collapsed to a bar displaying a number of tasks to be completed or that have been completed within the range of dates. The user also may be able to scroll within the task bar to view one or more tasks included in the portion of the tasks not previously displayed in the daily task list.

Each of the plurality of tasks may be assigned a color code that allows a task to be visually identifiable in association with another task, an appointment, or a contact to which the color code also has been assigned.

A chosen task may be dragged to a destination. The destination may be a target task list for a target date, wherein the chosen task is associated with the target task list for the target date. The destination also may be a target schedule upon which a target appointment is created corresponding to the dragged task. The chosen task and the target appointment are then associated with each other.

A chosen object, such as an e-mail or a contact, may be flagged. Flagged entries are may either be shown together with tasks in a daily task list or, alternatively, a new related task may be automatically created using information from the flagged object. The new task is associated with a daily task list for the date for which the object is flagged or another start date or due date selected by a user.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. In addition, the first digit in three-digit reference numerals and the first two-digits in four-digit reference numerals refer to the figure in which the referenced element first appears.

DETAILED DESCRIPTION OF IMPLEMENTATIONS

This detailed description describes implementations of presenting a daily task list with schedules of appointments for one or more dates. Generally, the tasks included in the daily task list for each date are associated with that date as a result of the task being assigned that date as a start date, being assigned that date as a due date, or being marked as having been completed on that date.

Illustrative Operating Environment

Figure 1:
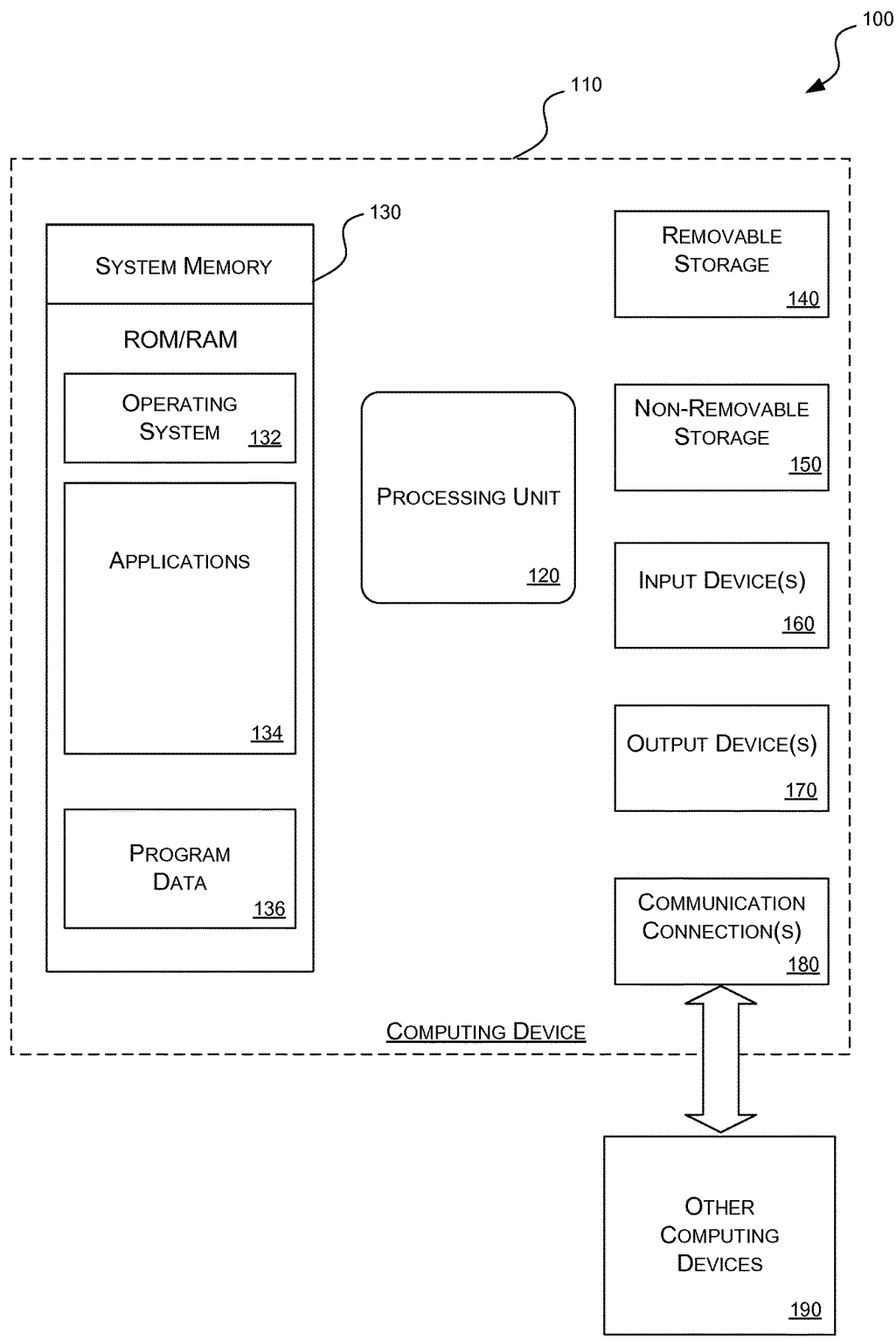
FIG. 1 is a block diagram of an operating environment for implementations of computer-implemented methods and user interfaces as herein described.

Implementations of displaying a daily task list may be supported by a number of electronic or computerized devices which receive electronic communications regarding appointments, e-mail, and other objects from other computing devices over a network. FIG. 1 is a block diagram of a representative operating environment 100.

Referring to FIG. 1, an exemplary operating environment 100 includes a computing device, such as computing device 110. In a basic configuration, computing device 110 may include a stationary computing device or a mobile computing device. Computing device 110 typically includes at least one processing unit 120 and system memory 130. Depending on the exact configuration and type of computing device, system memory 130 may be volatile (such as RAM), non-volatile (such as ROM, flash memory, and the like) or some combination of the two. System memory 130 typically includes operating system 132, one or more applications 134, and may include program data 136.

Computing device 110 may also have additional features or functionality. For example, computing device 110 may also include additional data storage devices (removable and/or non-removable) such as, for example, magnetic disks, optical disks, or tape. Such additional storage is illustrated in FIG. 1 by removable storage 140 and non-removable storage 150. Computer storage media may include volatile and non-volatile, removable and non-removable media implemented in any method or technology for storage of information, such as computer readable instructions, data structures, program modules or other data. System memory 130, removable storage 140 and non-removable storage 150 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 110. Any such computer storage media may be part of device 110. Computing device 110 may also have input device(s) 160 such as a keyboard, mouse, pen, voice input device, touch input device, etc. Output device(s) 170 such as a display, speakers, printer, etc. may also be included.

Computing device 110 also contains communication connection(s) 180 that allow the device to communicate with other computing devices 190, such as over a network or a wireless network. Communication connection(s) 180 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Daily Task List on the Calendar Showing Tasks by Due Date and Start Date

Figure 2:
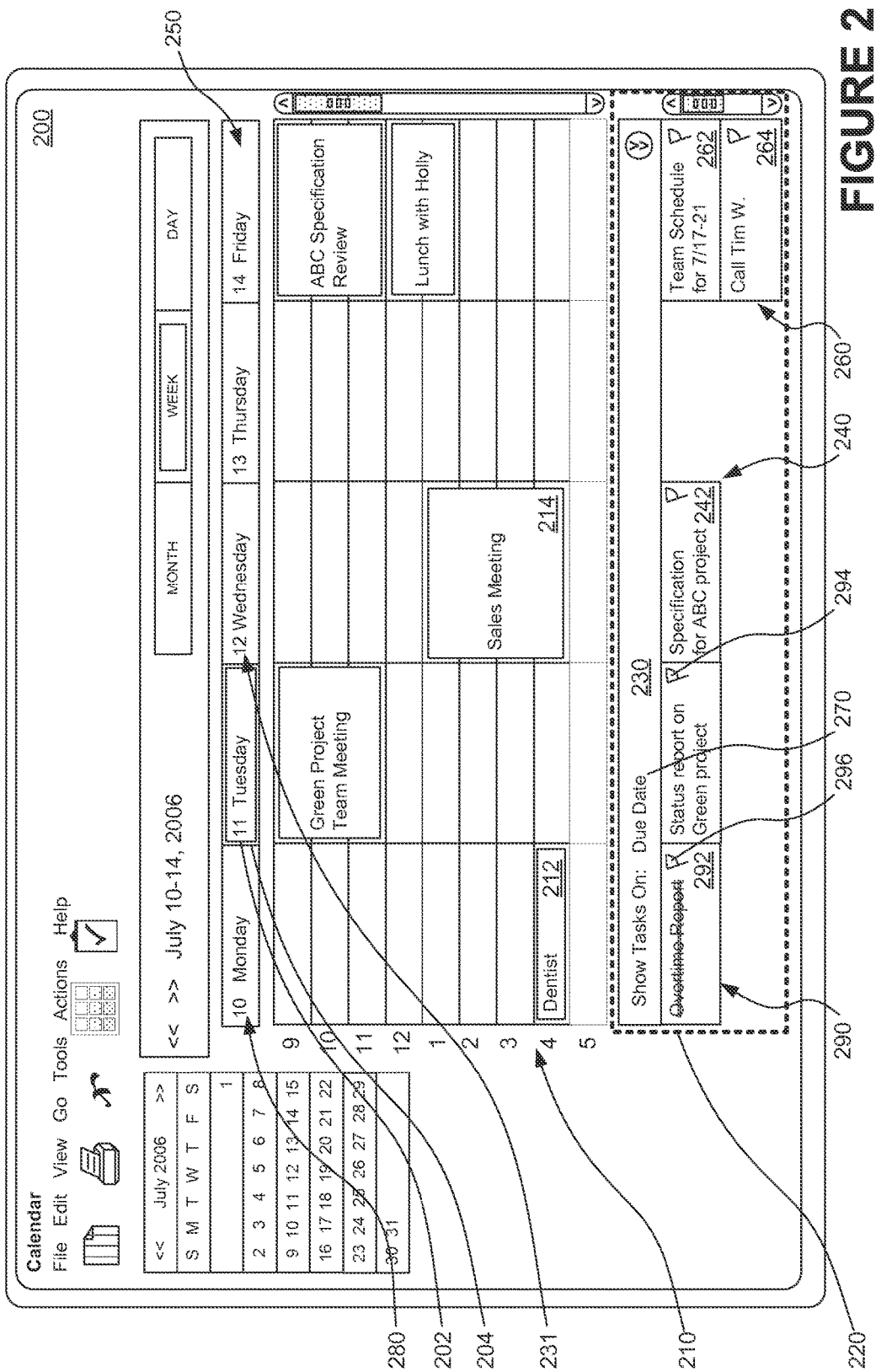
FIGS. 2-16 and 25 are screen displays of appointments and tasks displayed for a range of dates spanning a representative five-day work week.
Figure 3:
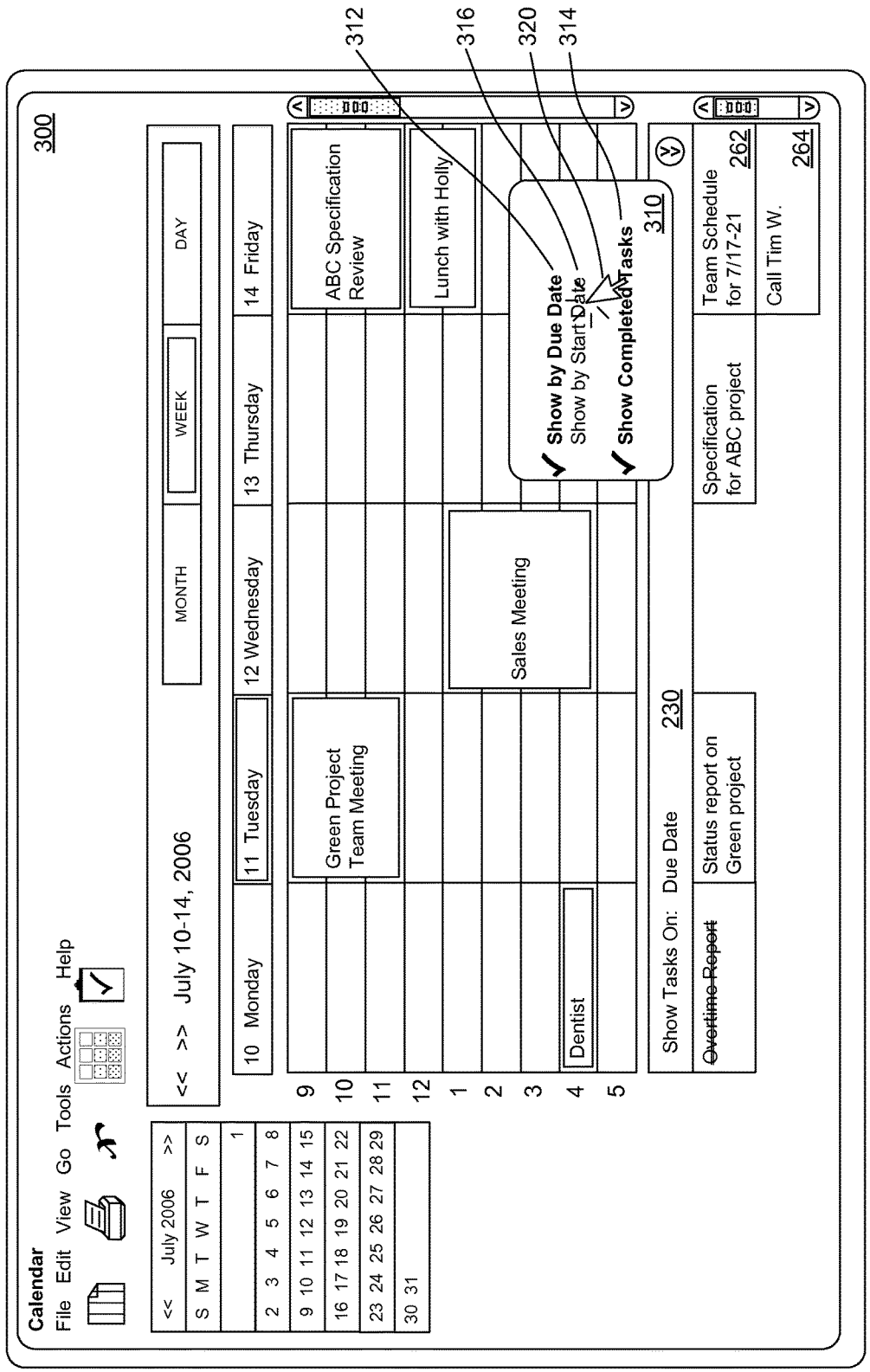
Figure 4:
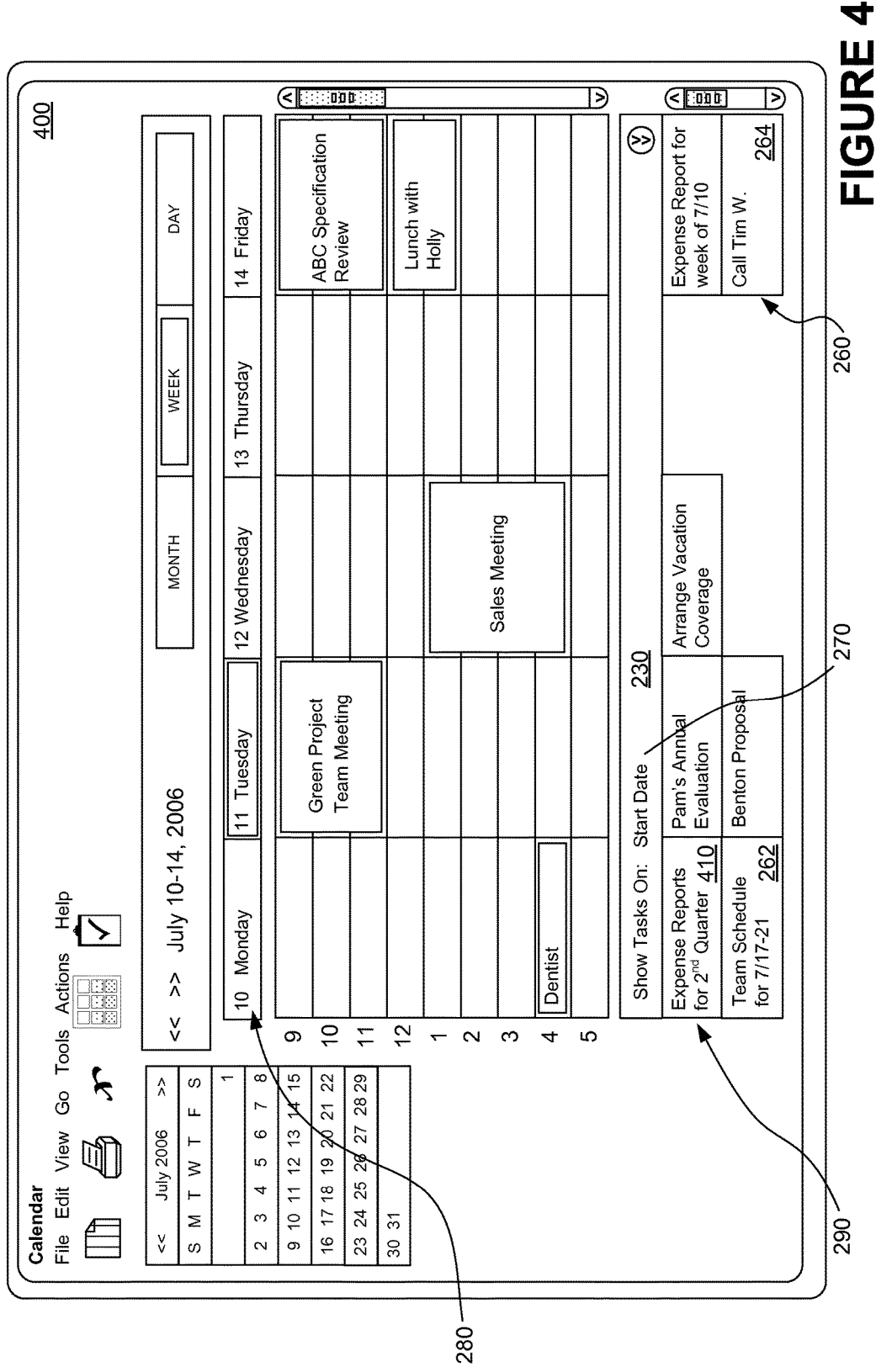

Implementations of displaying a daily task list on a calendar are described in relation to FIGS. 2-4 which show screen displays 200-400, respectively, from a calendar viewed on Tuesday, Jul. 11, 2006. A daily highlight box 202 positioned over the "11 Tuesday" header 204 indicates that the current date is Tuesday, July 11.

FIG. 2 shows a screen display 200 showing a schedule of appointments 210 and a series of daily task lists 220 marked with a dotted line. In one implementation, the series of daily task lists 220 is presented alone, allowing a user to view solely the tasks included in the daily task lists 220. In other implementations, such as shown in FIG. 2, the daily task lists 220 are presented with the schedule of appointments 210 to allow a user to view his or her daily tasks and appointments in a single view. In still other implementations, the daily task lists 220 could be presented along with a view of the user's contacts, e-mails, or in a window alongside other information.

In FIG. 2, the schedule of appointments 210 spans a range of dates covering a typical five-day workweek. In this example, the representative workweek spans the week of Monday Jul. 10, 2006, through Friday, Jul. 14, 2006. The schedule of appointments 210 includes a plurality of appointments spread over the workweek. For example the user has a dentist appointment 212 scheduled at 4:00 p.m. on Monday, July 10, and a sales meeting 214 scheduled from 1:00 p.m. through 5:00 p.m. on Wednesday, July 12.

The series of daily task lists 220 are displayed beneath a task bar 230 that can be used to manipulate the daily task lists 220 and provide information about the daily task lists 220 as is described below. For example, beneath a July 12 schedule of appointments 231, a July 12 daily task list 240 is presented. Similarly, beneath a July 14 schedule of appointments 250, a July 14 daily task list 260 is presented. The July 12 daily task list 240 includes one task, a "Specification for ABC project" task 242. The July 14 daily task list 260 includes two tasks: a "Team Schedule for 7/17-21" task 262 and a "Call Tim W." task 264. By presenting the daily task lists 240 and 260 beneath the schedules of appointments 231 and 250, respectively, for each of the respective dates, a user can see a glance what tasks are associated with each of the displayed dates.

The daily task lists 220 are not joined in a single, undifferentiated list of all tasks presented on the calendar. Tasks are listed separately for each of the respective dates included in the schedule of appointments 210. In particular, in the example of FIG. 2, the tasks displayed for each of the dates includes the tasks to be completed on each of those respective dates. The taskbar 230 presents a view indicator 270 indicating that tasks displayed in each of the daily task lists 220 are tasks with a start or due date matching the respective dates beneath which each is displayed. For example, the "Specification for ABC project" task 242 is displayed in a July 12 daily task list 240 presented under schedule of appointments 231 because the task 242 is marked with a due date of July 12. Similarly, the "Team Schedule for 7/17-21" task 262 and "Call Tim W." task 264 are displayed in a July 14 daily task list 260 under the July 14 schedule of appointments 250 because the tasks 262 and 264 both are marked as due on Friday, July 14.

A given task's visibility on the daily task list is controllable by user selection. For example, the user may choose whether the computer displays tasks that the user has marked as completed. For example, a July 10 schedule of appointments 280 is presented with a July 10 daily task list 290 that includes an "Overtime Report" task 292. In one implementation, the task designation is stricken through with a font having a different color or transparency, such as a gray font, and a check mark, indicating the task is complete. A task may be marked as completed by clicking on a completion field in the task indicated by a symbol, such as a flag symbol 294 and 296. In FIG. 2, the "Overtime Report" task 292 includes a darkened flag symbol 294, indicating the task is complete. Other tasks each include an open flag symbol 296 indicating the task is not yet complete. The flag symbols 294 and 296 are just one example of a symbol that may indicate whether a task is completed. Other symbols, such as a check or checkbox symbol, an "X" symbol, or any number of symbols may be used to indicate whether a task is or is not completed. Alternatively, a task may be marked as completed by selecting the task and engaging a menu or dialog box that provides for marking the task complete. The "Overtime Report" task 292 was marked as completed on Monday, July 10, thus the "Overtime Report" task 292 is displayed as completed in the July 10 daily task list 292 regardless of its start and due date.

Being able to display completed tasks in association with the day on which the tasks were completed allows a user to be able to account for his or her time and accomplishments, as well as providing a record for reporting completion of the "Overtime Report" task 292. A selection may be made whether or not to display completed tasks, as described further below.

Instead of viewing daily task lists according to the due date of the tasks, the daily task lists may be presented according to the start date of the tasks. The daily task lists also may be presented with or without completed tasks being shown on the dates they were completed. FIG. 3 shows a screen display 300 in which a selection is made to view tasks according to the date the tasks are scheduled to begin. In one implementation, in addition to providing an indicator showing how the tasks are being presented (e.g., the due date indicator 270), the task bar 230 provides an interface to allow a user to change what tasks are displayed.

In FIG. 3, a view menu 310 is invoked to change what tasks are included in the daily task list. For example, the view menu 310 may be invoked by a user moving a cursor 320 to the task bar 230 and "right clicking" on a pointing device to invoke such a menu. "Right clicking" is understood in the art as just one mechanism by which such a menu may be invoked. The resulting view menu 310 shows that a "Show by Due Date" option 312 and a "Show Completed Tasks" option 314 are currently selected, as indicated by the boldface print and the adjacent check marks. To change the view, for example, it is assumed that the user moves the cursor 320 to the "Show by Start Date" option 316 and selects that view. Also for example, it is assumed that the user moves the cursor to the "Show Completed Tasks" option 314 and selects it to toggle off the view of the completed tasks.

FIG. 4 shows a screen display 400 resulting from the user's selections. The view indicator 270 in the task bar 230 now indicates that the task bar 230 presents the daily task lists in a "Start Date" view. Comparing FIGS. 3 and 4, nearly all the tasks displayed in the screen display 300 of FIG. 3 are gone or have moved, while tasks displayed in the screen display 400 of FIG. 4 are new tasks or tasks that have moved. For example, in the screen display 400, the July 10 daily task list 290 shows an "Expense Reports for $2^{nd}$ Quarter" task 410 that was not included in the screen display 300 of FIG. 3. Presumably, this is a task having a start date on Monday, July 10, and a due date after the week of July 10-14. Thus, this task did not appear in a list of tasks having a due date during that week as shown in FIG. 3.

On the other hand, the "Team Schedule for 7/17-21" task 262 did appear in FIG. 3, although the task there appeared in the July 14 task list 260. The task 262 moved to the July 10 task list 290 from the July 14 task list 260 presumably because, although the task 262 was assigned a due date of Friday, July 14, the task 262 was assigned a start date of Monday July 10. Thus, in the start date view, the task 262 appears on its assigned start date instead of appearing on its due date.

In addition, it should be noted that the "Call Tim W." task 264 has remained listed in the July 14 task list 260. Presumably, because this is not a lengthy project or task, the "Call Tim W." task 264 can be completed within a single day. Thus, the task 264 was assigned both a start date and a due date of Friday, July 14.

Finally, it should be noted that the "Overtime Report" task 292 does not appear in the screen display 400 of FIG. 4. As previously explained with reference to FIG. 3, the view of FIG. 4 is the result of two user selections. First, it was assumed that the user selected the "Show by Start Date" option 316. In addition, the user also selected the "Show Completed Tasks" option 314 to toggle off the view of the completed tasks. Thus, because the completed tasks are not being shown in FIG. 4, the completed "Overtime Report" task 292 is not shown the screen display 400 of FIG. 4.

Moving and Creating Tasks in the Daily Task List

The daily task list allows for simple manipulation and creation of tasks, described in relation to FIGS. 5-8 which show screen displays 500-800, respectively, from a calendar viewed on Wednesday, Jul. 12, 2006. The daily highlight box 202 positioned over the "12 Wednesday" header 504 indicates that today's date is Wednesday, July 12.

Figure 5:
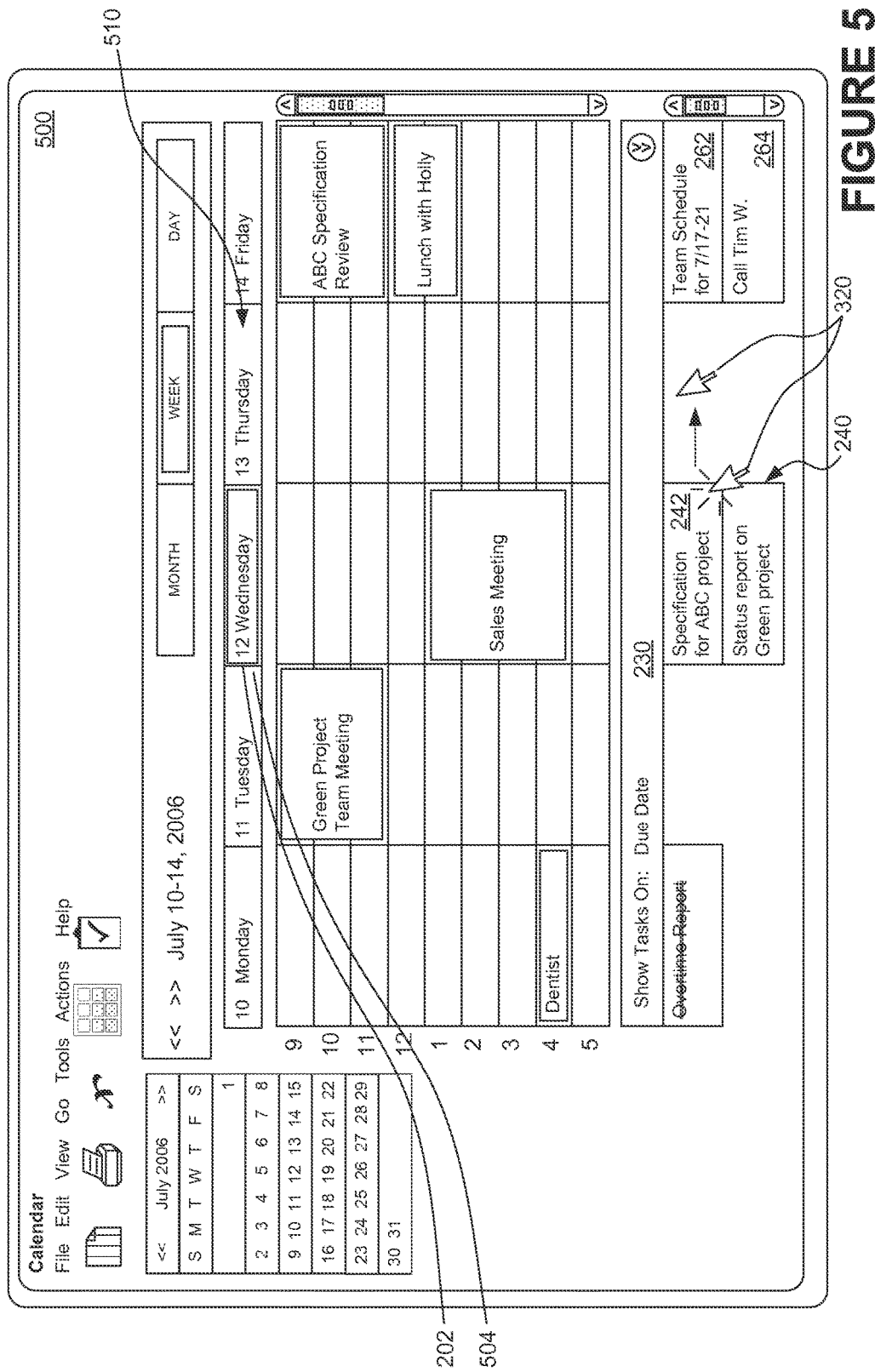

One implementation of the task list allows for tasks to be moved by dragging them from one task list to another task list. FIG. 5 shows the dragging of the "Specification for ABC Project" task 242 from the July 12 daily task list 240. The "Specification for ABC Project" task 242 originally was assigned a due date of Wednesday, July 12, but the user has determined that the task instead will be due the next day, Thursday, July 13. To change the due date of the task 242, the user manipulates a pointing device to position the cursor 320 on the task 242 and drag the task 242 under the July 13 schedule of appointments 510.

Figure 6:
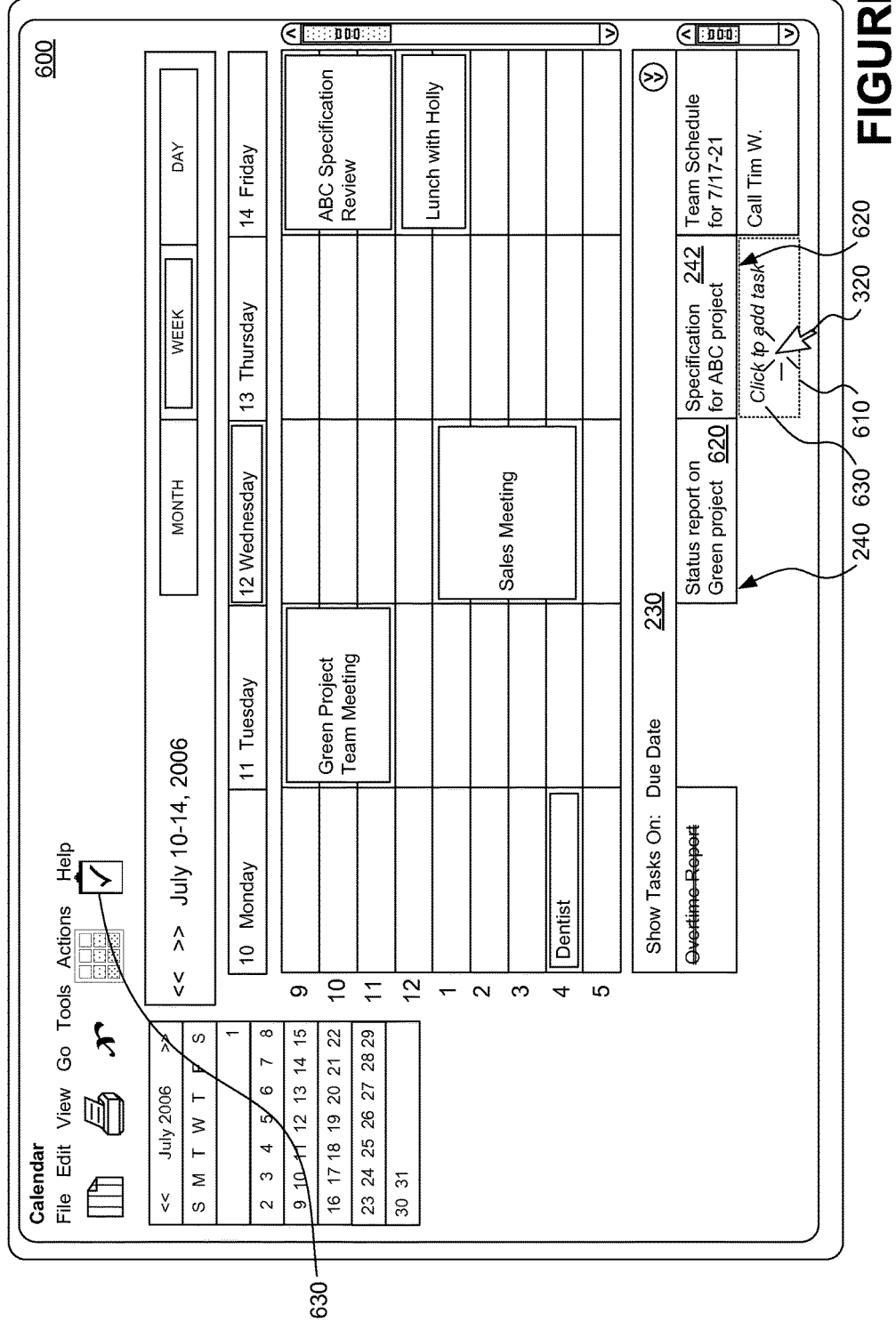
Figure 7:
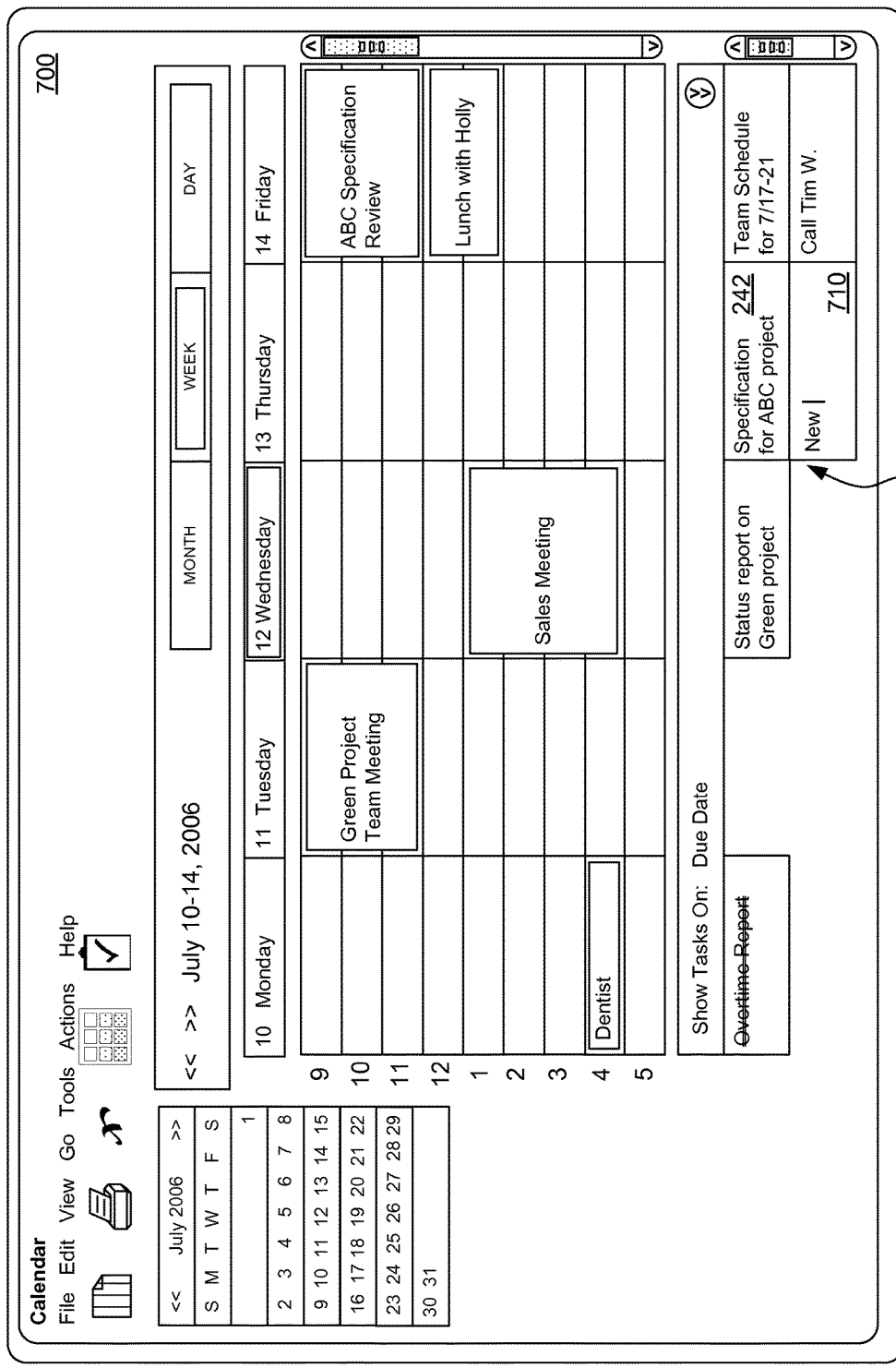

Previously, no tasks were due on Thursday, July 13, thus no tasks appear in the task list. However, as illustrated by FIG. 6, dragging the task 242 to the space beneath the task bar 230 under the July 13 schedule of appointments 510 adds task 242 for this date. The screen display 600 of FIG. 6 shows the creation or appearance of a new July 13 task list 610 listing the "Specification for ABC Project" task 242. The shift in the "Specification for ABC project" task 242 leaves the "Status report on Green project task" 620 as the sole remaining task in the July 12 daily task list 240.

Implementations of dragging a task within the due date view may be configured such that dragging the task does or does not change the due date. In other words, dragging the "Specification for ABC project" task 242 to the July 13 task list 610 may change the due date from Wednesday, July 12, to Thursday, July 13. On the other hand, the calendar may be configured to display the dragged "Specification for ABC project task" 242 on Thursday, July 13, but indicate the task is overdue. Overdue tasks may be indicated by color changes, font changes, or applying other indicators in the display of the task, or in an associated dialog box (not shown in FIG. 6). Alternatively, the fact that a task is overdue may be presented in an overdue task report (not shown). Further alternatively, the fact that a task is overdue may not be indicated in a task list.

For overdue tasks not completed by the original due date, an implementation of the daily task list may automatically cause an overdue task in the due date view to rollover to the next date. For example, referring to FIG. 2, it should be noted that the July 12 daily task list 240 did not include the "Status report on Green project" task 620. This is because in the due date view shown in the screen display 200 of FIG. 2, the "Status report on Green project" task originally was listed for completion on Tuesday, July 11. However, the task 620 was not marked completed and, in the due date view for Wednesday, July 12, shown in FIGS. 5 and 6, the task 620 has rolled over to the current date. Thus, in this implementation, overdue tasks are carried forward past their original due dates so that, even though a task may be overdue, it will not be overlooked.

Implementations of the daily task bar 230 allow tasks to be created in a number of ways. For example, one way to create a task is to click on a task button 630, which invokes a dialog box (not shown) to create a new task. Alternatively, a keystroke combination could invoke the same dialog box.

Alternatively, in one implementation of the daily task list, a user simply can enter the task within the daily task list for the desired date. In the screen display 600 of FIG. 6, the user manipulates a pointing device to click the cursor 320 in an empty space 610 represented by a box outlined with a dotted line beneath the July 13 daily task list 620. In one implementation of the daily task list, a prompt such as "Click to add task" 630 may be shown in the empty space 620 under the task list when the user hovers the cursor 320 over the empty space 610. Then, as shown in the screen display 700 of FIG. 7, the user can simply enter a "New" task 710, by typing or otherwise entering the task. The "New" task 710 is thus added to the July 13 daily task list 610. In one implementation, creating a task by entering it directly into the task bar 230, the default start date and due date will be the date under which the task is entered. Thus, by entering the "New" task 710 in the July 13 daily task list, the "New" task 710 is assigned a start date and a due date of July 13.

Figure 8:
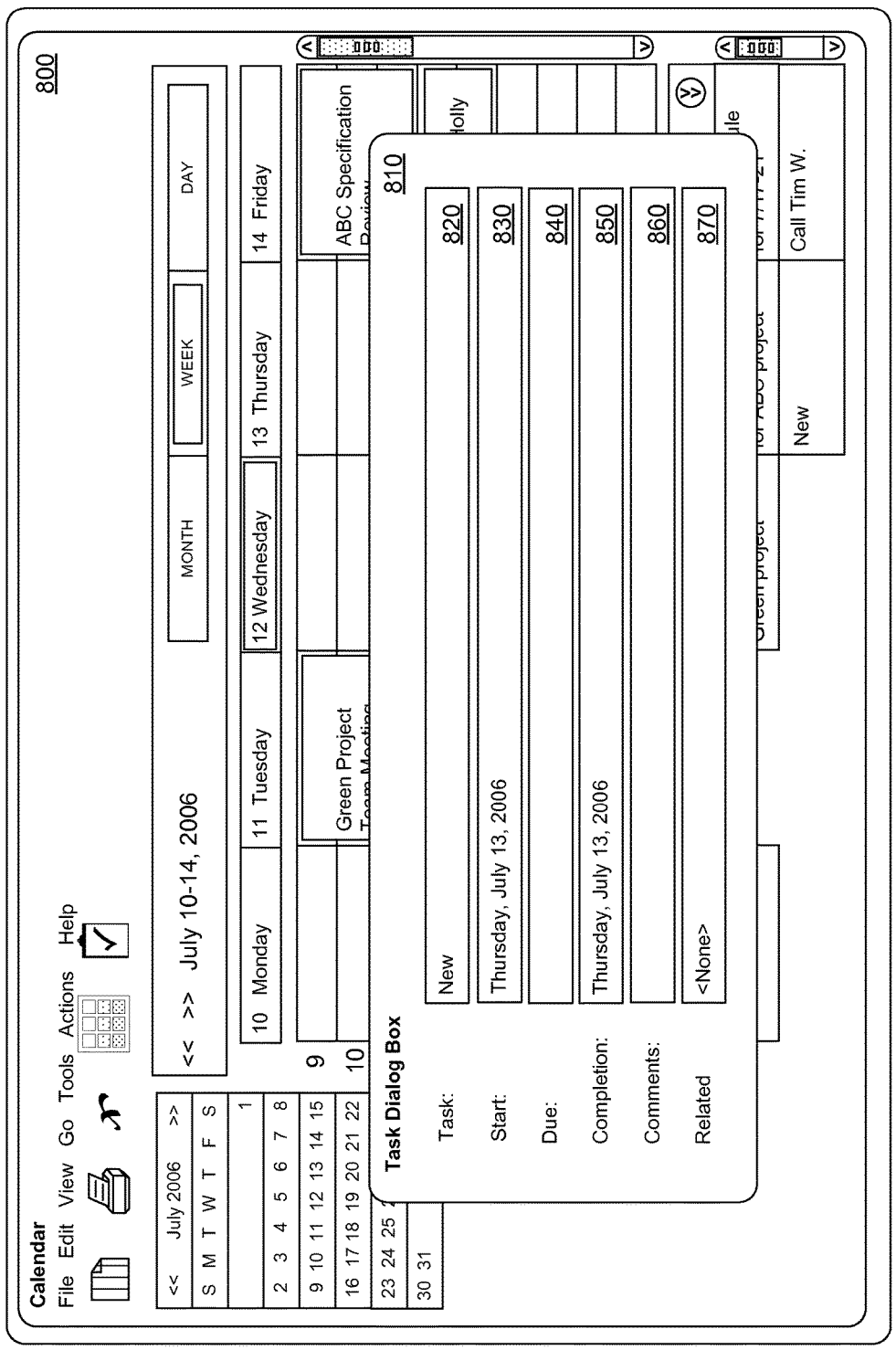

As shown in screen display 800 of FIG. 8, to adjust the properties of the task, a user can invoke a task dialog box 810. The dialog box 810 may be invoked by "double-clicking" a task with a pointing device, from a menu accessible by "right-clicking" with a pointing device, or through a similar process. The task dialog box 810 includes a number of fields, including a task field 820, a start date field 830, a due date field 840, a completion date field 850, a comments field 860, and a related field 870. The task field 820 can be used to change the name of the task. The start date field 830 can be used to change the start date for the task. The due date field 840 can be used to change the due date for the task. The completion date field 850 can be used to mark a task as completed on a specific date, or by deleting the entry in the field, to mark it as uncompleted. The fields 820-840 thus can be used to affect how the task appears in a daily task list under the task bar, as well as on what dates the task appears in a due date view or a start date view. In one implementation, the start field 830 and the due field 840, instead of text entry fields, may invoke one or more buttons allowing the month, date, and year to be selected from menus.

The comments field 850 and the related field 860 may contain other information about the task. The comments field 850 may include notes about the task that a user wants to track, but does not want to appear in the daily task list for reasons of space limitations, privacy, or other reasons. The related field 860 provides information about whether the task is related to an appointment or another object. The related field 860 will be described in further detail below with reference to FIGS. 21-22.

It should be noted that it is not necessary to engage a menu or a dialog box in order to manipulate the attributes of tasks. In various implementations, for example, one can change the name of a task in the daily task list by clicking on the name of the task and typing over the existing name. As previously mentioned, one can mark a task complete by clicking on the flag symbol 294 and 296 (FIG. 2). Also, one can change the date of a task by right clicking on a flag indicator and changing the date from the flagging menu. In addition, one can change the date of the task by double clicking on the item and selecting a flagging menu. Many variations may be used to adjust the attributes of tasks included in daily task lists.

Assigning Colors to Tasks and Other Objects

Tasks may be assigned color codes to provide for visual identification of related tasks and/or other related objects such as appointments, e-mails, contacts, and other objects maintained within the computing environment, as described in relation to FIGS. 9-13 that show screen displays 900-1300, respectively. The color codes are represented by different fill patterns in the figures, but it should be appreciated that, in addition to fill patterns, the color codes may also be represented by actual colors, including graduated colors, solid colors, or other visual indicators. For simplicity, however, the visual indicators will be referred to collectively as "color codes."

Figure 9:
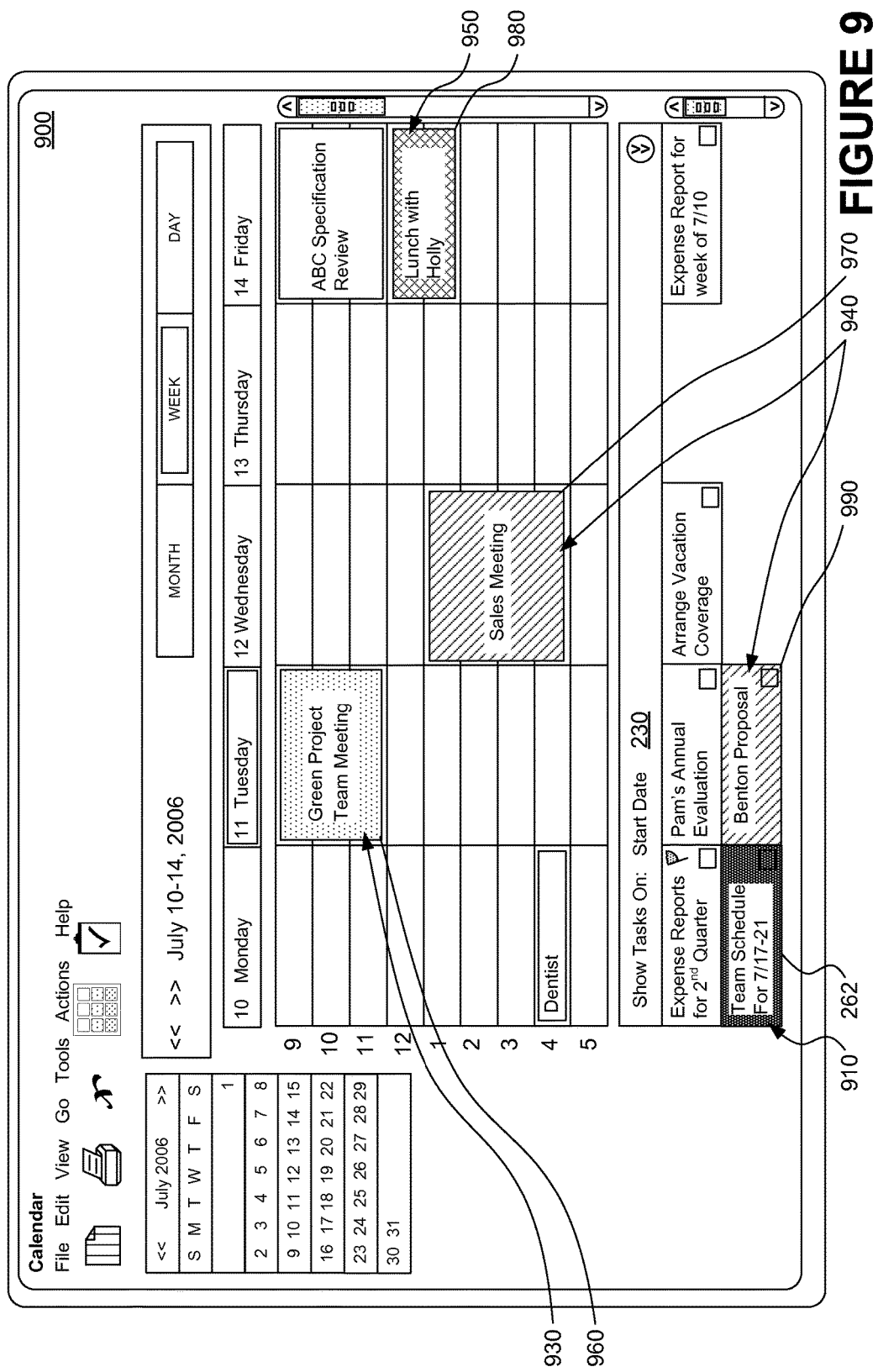
Figure 10:
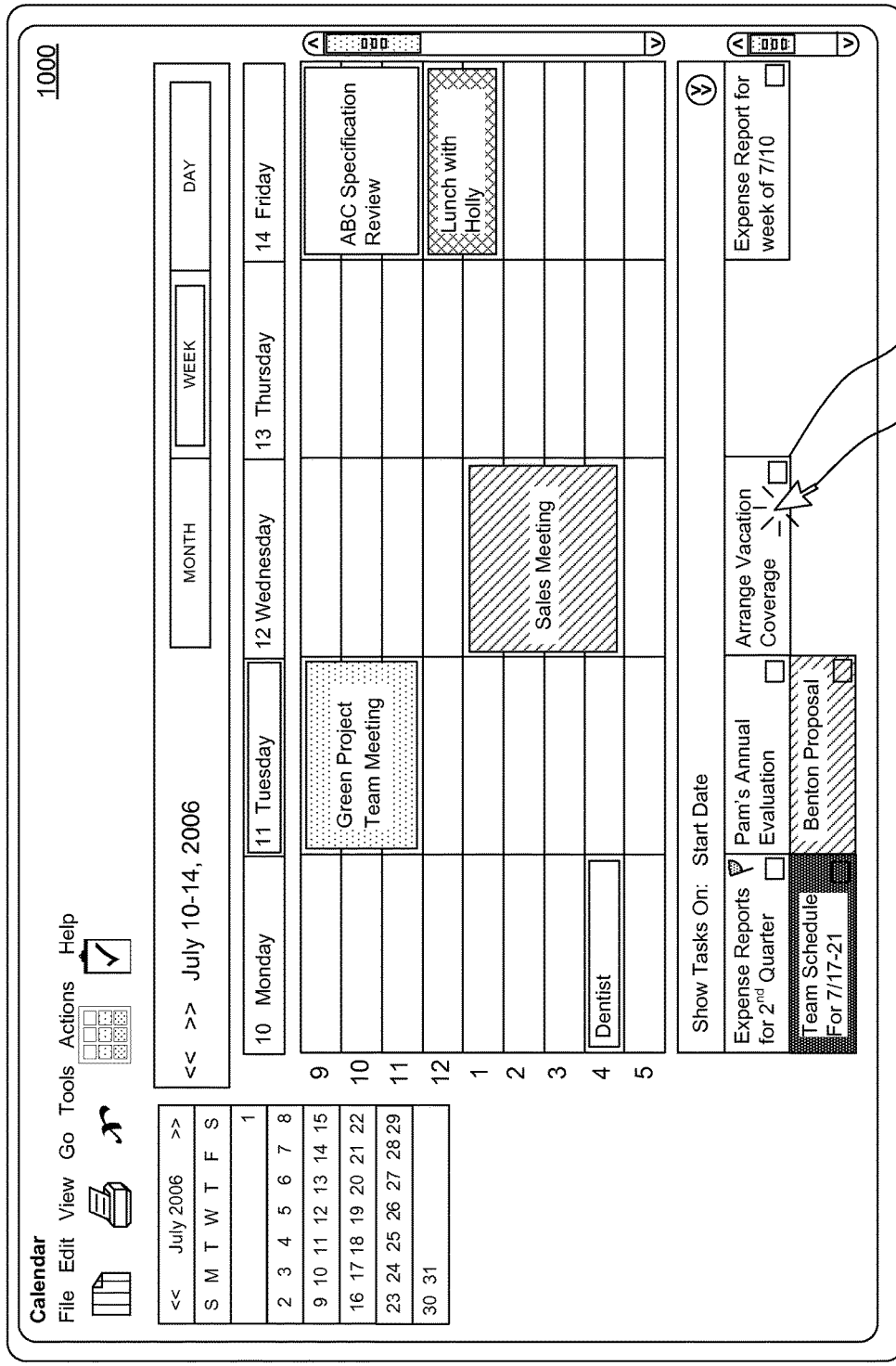

The screen display 900 of FIG. 9 shows "Team Schedule for 7/17-21" task 262 depicted with a dark color code 910 represented by dark background shading. The dark color code 910 includes one of a plurality of color codes supported by the calendar. The color codes are selectable by a user to represent whatever association the user may choose. For purposes of example, it is presumed the user has selected the dark color code 910 to represent staffing issues. By way of other examples, the user has selected a light color code 930 represented by dotted fill to signify association with the Green project, a medium color code 940 represented by cross-hatching to signify sales issues, and a medium-dark color code 950 represented by a criss-cross fill to signify personal issues. By virtue of these color codes, at a glance, a user can visually determine which objects presented on a calendar display are associated with one another.

The color codes are not restricted to tasks presented in the task bar. As shown in the screen display 900 of FIG. 9, color codes may be assigned to appointments, just as the light color code 930 is assigned to the "Green Project Team Meeting," and the medium color code 940 is assigned to the "Sales Meeting" 970. The color codes may represent something to the user in and of themselves, as the medium-dark color code 950 assigned to the "Lunch with Holly" appointment 980 may signify the object is a personal matter. In addition, when two or more objects are assigned the same color code, the user may not only know what the color code topically signifies, but the common color coding will indicate to the user that the objects are related to one another. Thus, the user can view the "Sales Meeting" appointment 970 and the "Benton Proposal" task 990 and see that they both deal with a topic, such as sales, by virtue of the medium color code 940 assigned to both objects, thereby visually associating the appointment 970 and the task 990.

In one implementation, a color code is assigned to an object such as a task or appointment by invoking a color menu. In the screen display 1000 of FIG. 10, a user invokes the color menu by directing the cursor 320 to a selected task, which in this case is the "Arrange Vacation Coverage" task 1010. In one implementation, the color menu is invoked by "right-clicking" on the task.

Figure 11:
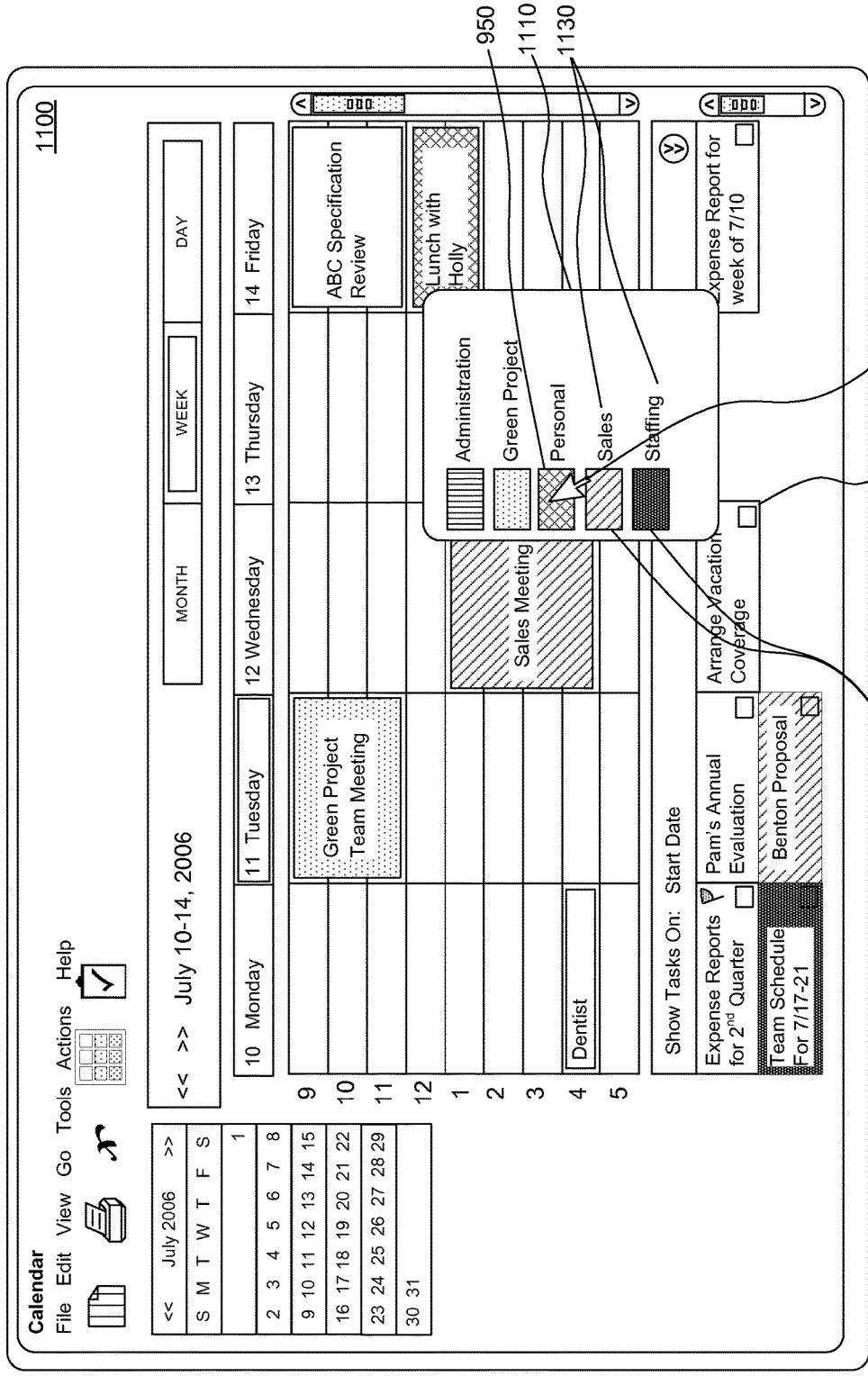
Figure 12:
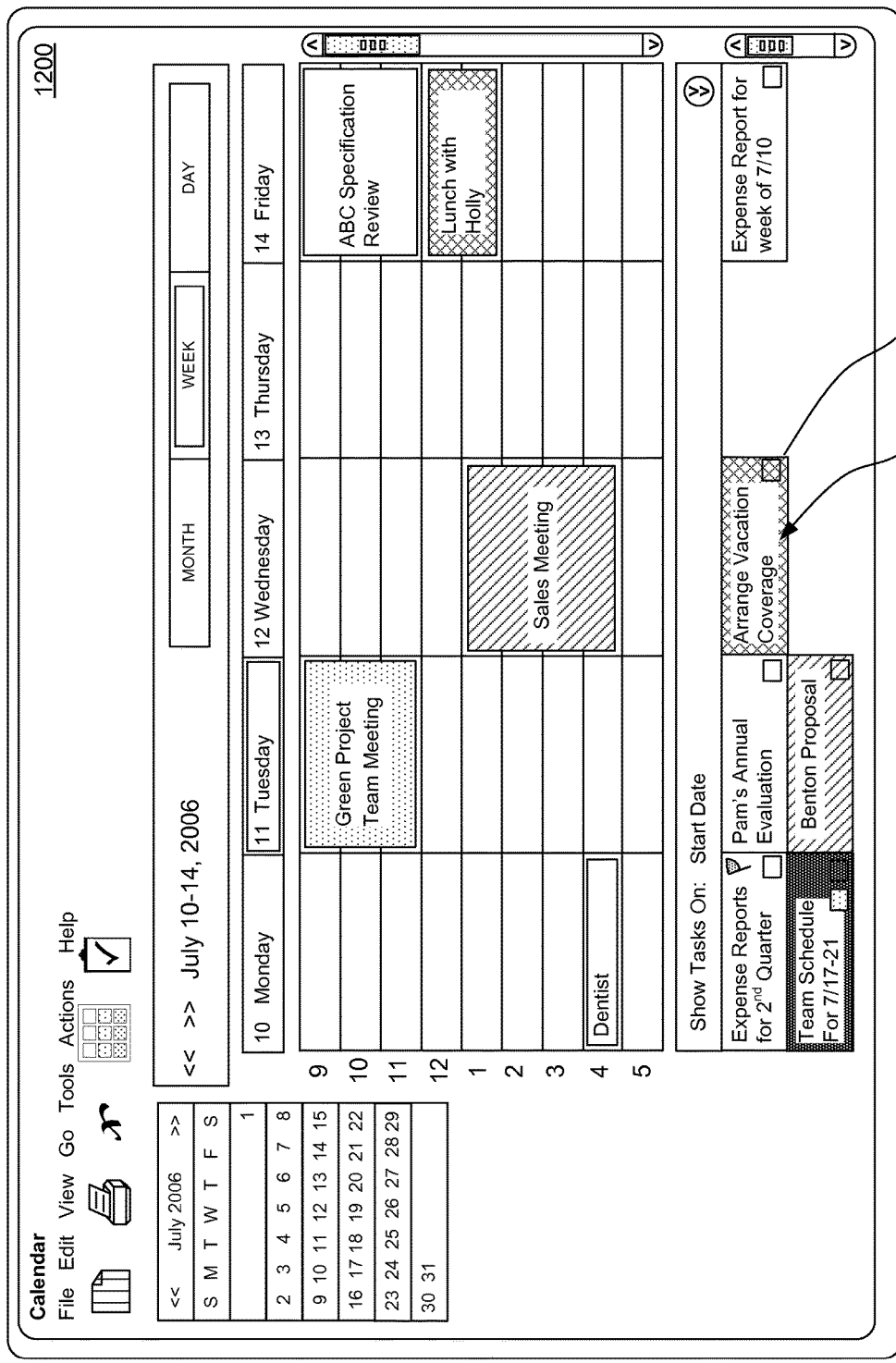
Figure 13:
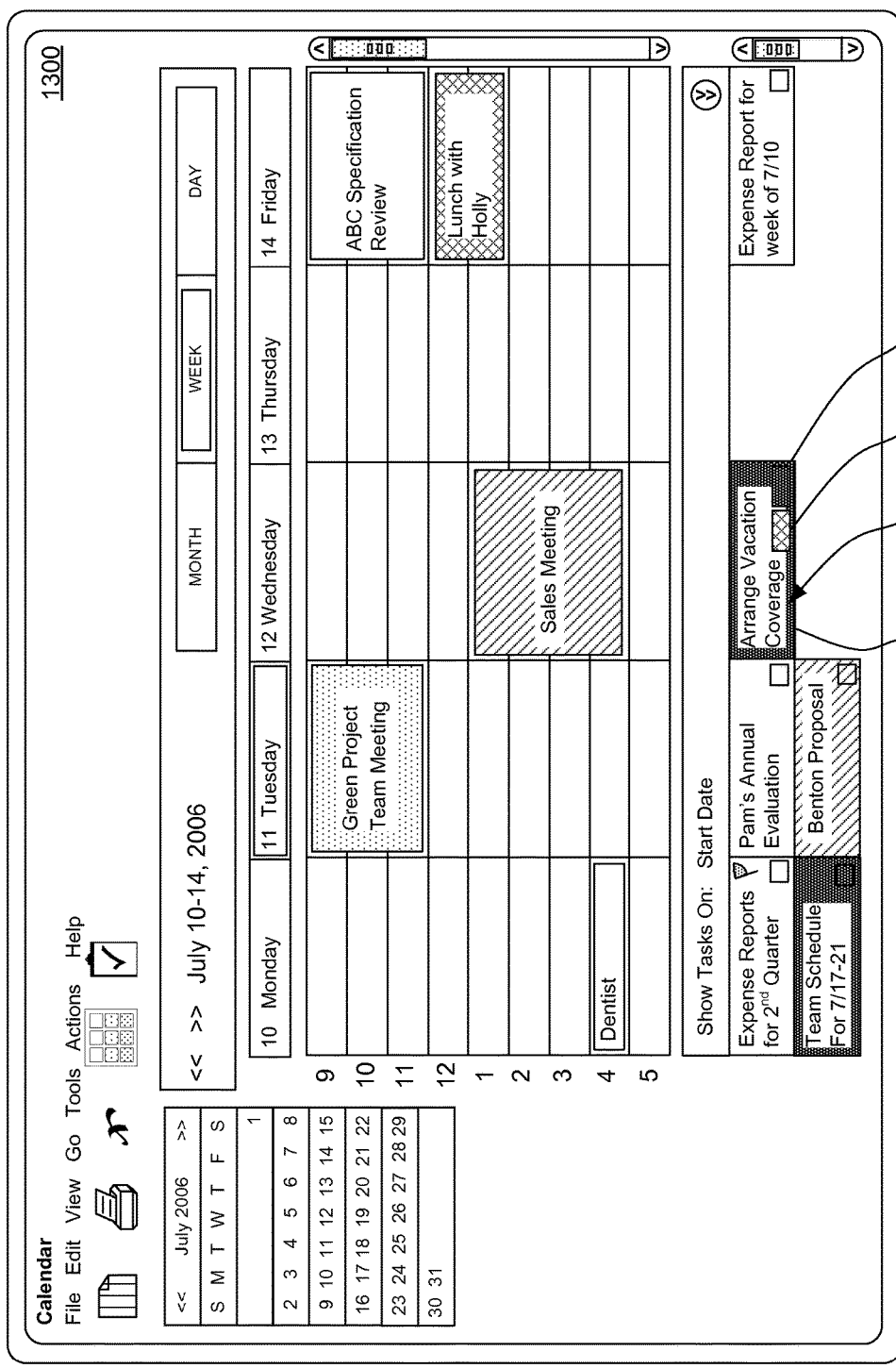

Screen display 1100 of FIG. 11 shows the color menu 1110. The color menu 1110 includes a plurality of color codes 1120. In one implementation, the color codes 1120 being used can be defined with descriptions 1130 to indicate which color code 1120 signifies what topic. In the example of the screen display 1100, the user directs the cursor 320 to select the medium dark color code 950 that signifies a personal matter. Once the operation is complete, as shown in screen display 1200 of FIG. 12, the "Arrange Vacation Coverage" task 1010 appears with a medium dark color code 950, visually indicating that the task 1010 is related to a personal matter.

Not all objects, whether tasks, appointments, or other objects, can be classified as relating only to a single topic, however. Thus, as shown in screen display 1300 of FIG. 13, more than one color code can be assigned to an object. In screen display 1300, a dark color code 920 has been assigned to the "Arrange Vacation Code" task 1010. The dark color code 920 signifies that the task 1010 is not merely a personal issue, but also affects staffing issues. However, to maintain the designation as a personal issue, color blocks 1330 and 1340 are assigned to the task 1010 to show both color codes assigned to the object. In one implementation, the dark color code 920, which is the most recently assigned code, is used to shade the task 1010 itself. However, both the previously assigned medium dark color code 950 and the dark color code 920 are assigned to color code blocks 1330 and 1340, respectively. Thus, one object can maintain a visual association with more than one color-coded topic.

Manipulating the Task Bar

The task bar 230, in presenting daily task lists for each of the dates being displayed, may occupy an appreciable portion of the available display space. In order to free additional space, for example, to view calendar items, the task bar 230 can be manipulated to alter the amount of space the task bar occupies.

Figure 14:
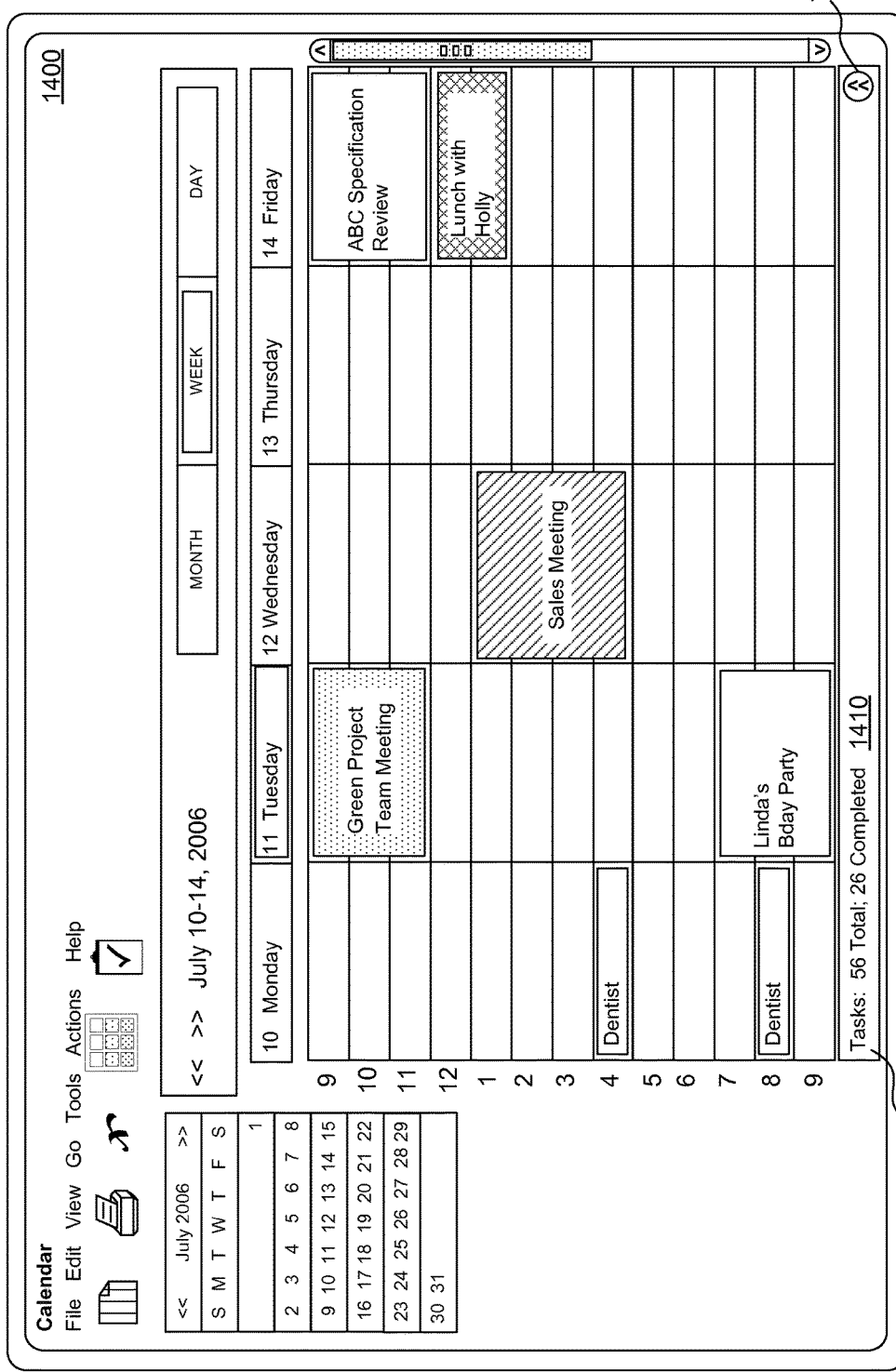

Screen display 1400 of FIG. 14 shows a collapsed task bar 1410. In one implementation, "double-clicking" on the task bar 230 (not shown in FIG. 14) reduces the task bar 230 to a collapsed task bar 1410 displayed at a bottom edge of the screen display 1400. The task bar 230 also may be collapsed using a sizing button 1420 on which the user can click with a pointing device to collapse or restore the task bar to its previous size. Further alternatively, the view menu may allow the user to collapse or minimize the daily task list.

The user may also click on a button or area in the collapsed task bar to invoke a temporary "pop-up" window to present the contents of the normal daily task bar. The pop-up window can be dismissed by clicking outside of it. The user may be able to interact with the pop-up version of the daily task bar in the same way as the normal task list For example, the user might be able to interact with the pop-up version of the daily task bar by manipulating a pointing device to right-click on a task to invoke a menu and double-click on a task to invoke the task dialog, or by scrolling the task list when the popup window cannot accommodate all the tasks in the task list.

In one implementation, the collapsed task bar 1410 may present a task count 1430 of the number of active tasks, completed tasks, total tasks, and/or uncompleted tasks that are represented in the task bar 230. With the task count 1430, even with the daily task list hidden, at a glance a user can see that there are a total of 56 total tasks, of which 26 are completed, for example.

Figure 15:
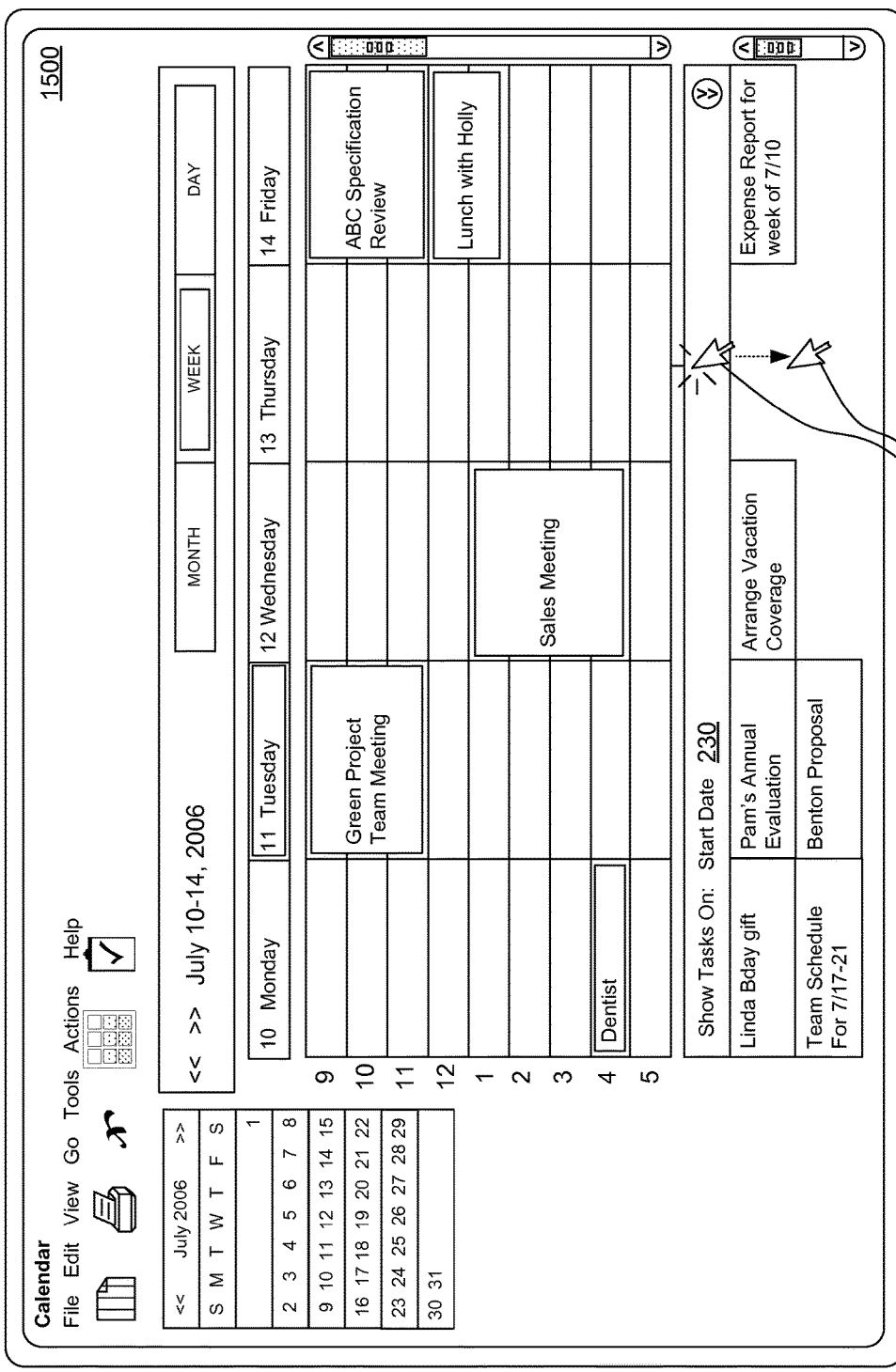
Figure 16:
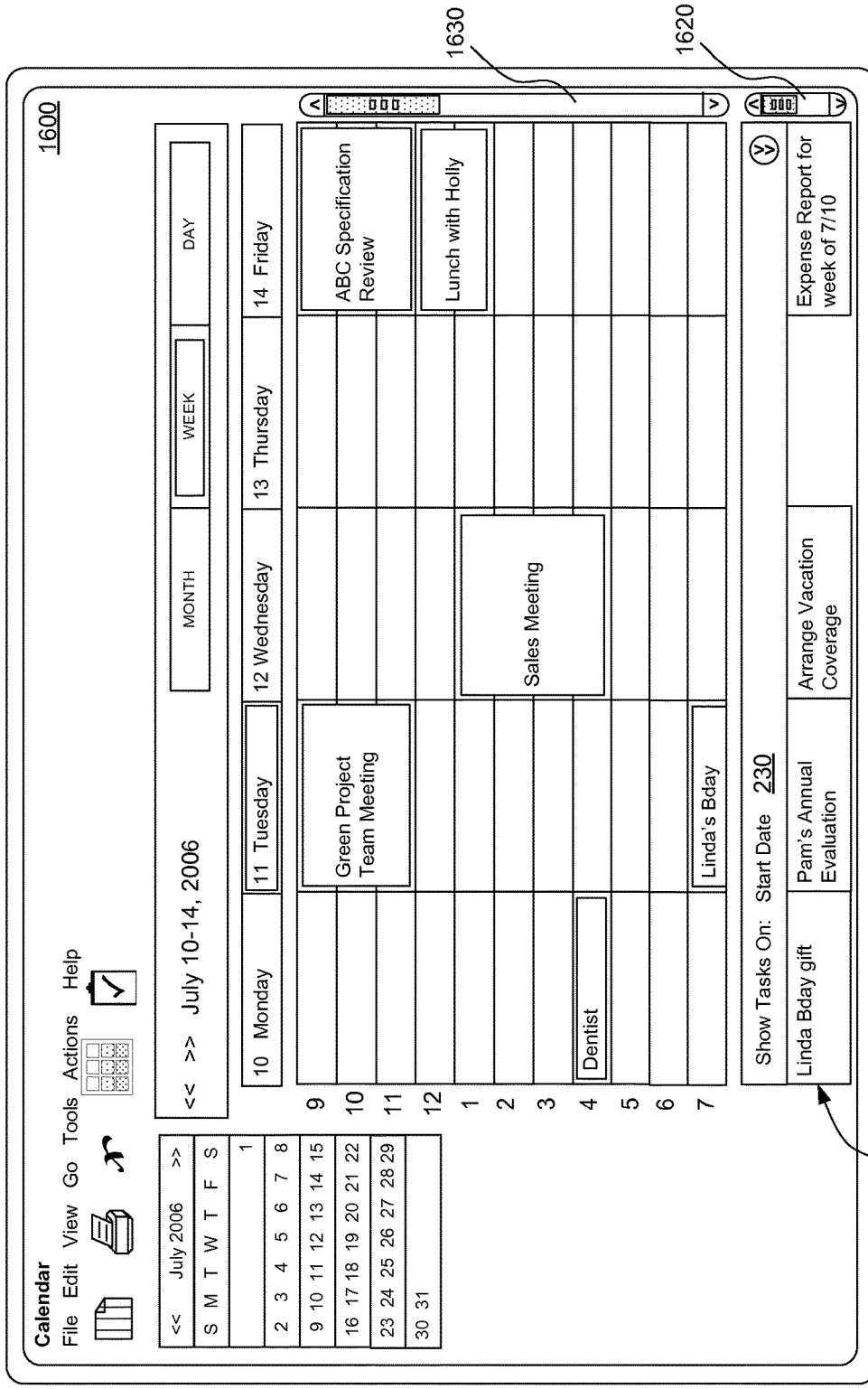

In the screen displays 1500 and 1600 of FIGS. 15 and 16, respectively, it is shown that the task bar 230 also can be sized. Short of collapsing the task bar 230, the task bar 230 can be reduced in size. In screen display 1500, the user manipulates a pointing device to position the cursor 320 on the task bar 230 and drag the task bar toward a lower edge of the screen display to resize the task bar 230. The screen display 1600 of FIG. 16 shows the task bar minimized to show only a single line of tasks 1610, freeing additional room for the display of calendar items. However, in one implementation, even when the task bar 230 is reduced to a small size, a task scroll bar 1620 is provided to allow the user to view tasks included in daily task lists within the task bar even when the task bar will not accommodate all the respective tasks for one or more days being displayed. Similarly, a calendar scroll bar 1630 may be provided to allow a user to scroll through calendar items that do not fit within the display area. The task bar 230 can be sized to make it larger as well as smaller to allow users flexibility in how they wish to view appointments and tasks.

Incorporating Daily Task Lists in a To Do List

In the foregoing examples, the daily task lists for each displayed date have been included in a task bar presented at the bottom edge of a display beneath a schedule of appointments for each of the respective dates. Alternatively, the task bar including the daily task lists could be displayed above the schedule of appointments, or displayed alongside the schedule of appointments.

Figure 17:
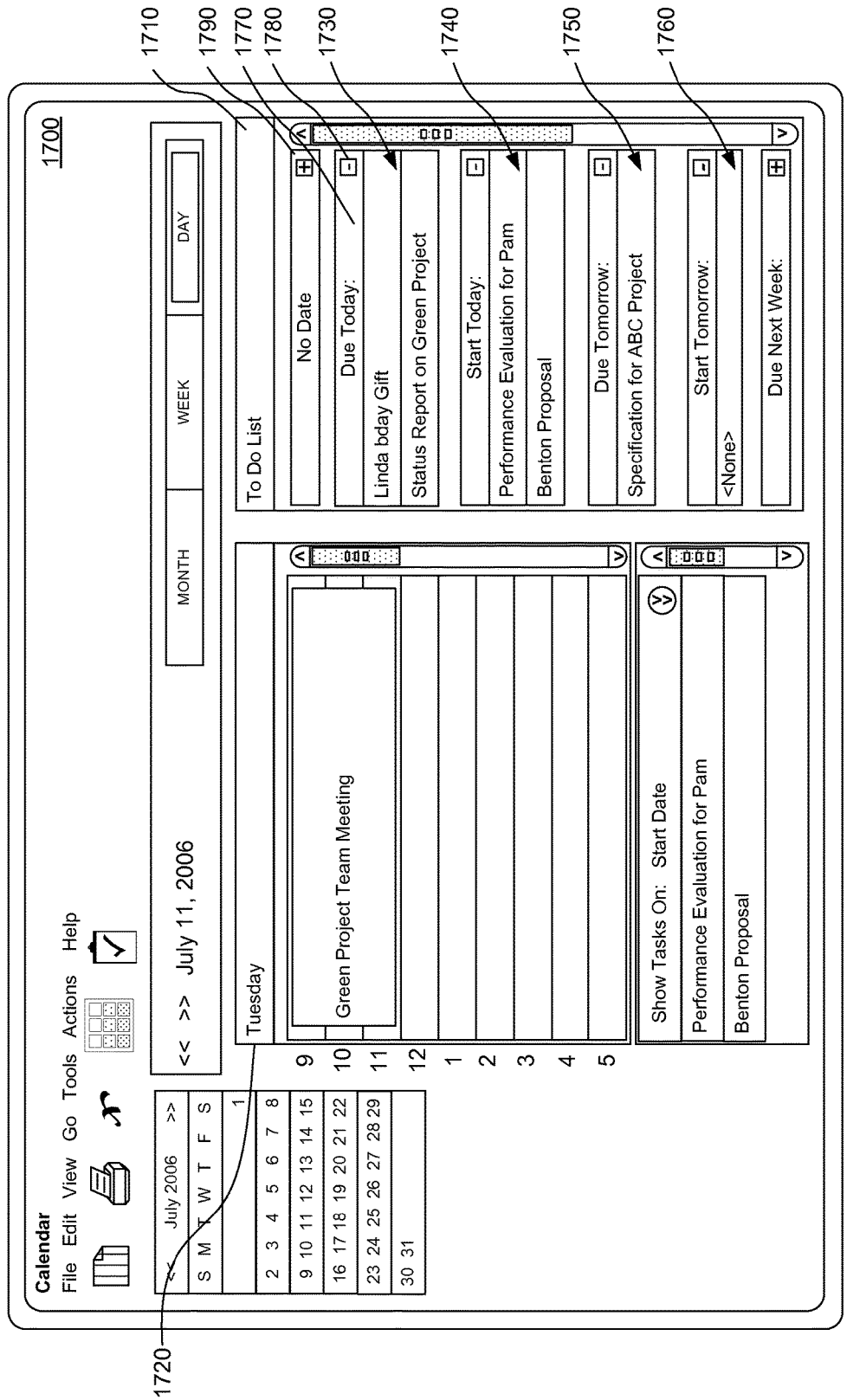
FIGS. 17-18 are screen displays of appointments and tasks displayed for a single date.

Another view that a user may desire is a to do list including all the user's tasks. The screen display 1700 of FIG. 17 shows a calendar view including a to do list 1710 displayed alongside the schedule of appointments 1720. In this example, a single-day view has been selected by the user, so the schedule of appointments 1720 covers only a single day.

At the user's option, a task bar 230 continues to be displayed below the schedule of appointments 1720. In the screen display 1700, the task bar 230 displays a start date view, thereby listing the tasks that have been scheduled to be begun on that day. In addition, the to do list 1710 shows other lists of tasks. In particular, the to do list includes a list of the tasks to be completed today 1730 and the list of tasks to be begun today 1740. The to do list 1710 also presents lists of tasks to be completed tomorrow 1750, tasks to be begun tomorrow 1760, and tasks to be completed or begun at other times.

To do list 1710 affords a number of options and advantages to the user. For example, the to do list 1710 allows a user to view a list of tasks in a manner that does not occupy space that may be used to display calendar items. In addition, the user may use the to do list 1710 to view lists of both tasks to be completed today and tasks to be started today, as well as lists for other designated dates or ranges of dates.

Nonetheless, even though the lists of tasks are grouped in a single list, the tasks are divided into groups under headings 1770 that signify the nature of the tasks. In other words, the tasks are still grouped according to a list of tasks to be completed today 1730, tasks to be started today 1740, etc. In one implementation, the headings 1770 each include an expand/collapse toggle button 1780 allowing the user to easily expand or collapse those lists the user wishes to view within the to do list 1710.

Another facet of the to do list is the listing of undated task items. The to do list 1710 includes an undated task section 1790 section for tasks to which no dates have been assigned, for example, because the tasks are ongoing in nature or because no start or due dates have yet been identified. As previously described, in one implementation of the task bar, only tasks that have an assigned start date or due date will be displayed; accordingly, there is no place in the task bar to present undated tasks. The undated task section provides a location for these tasks. Tasks in the undated task section 1790 optionally may be dragged to a daily task list to assign them dates as described with reference to FIG. 5 or otherwise assigned dates.

Figure 18:
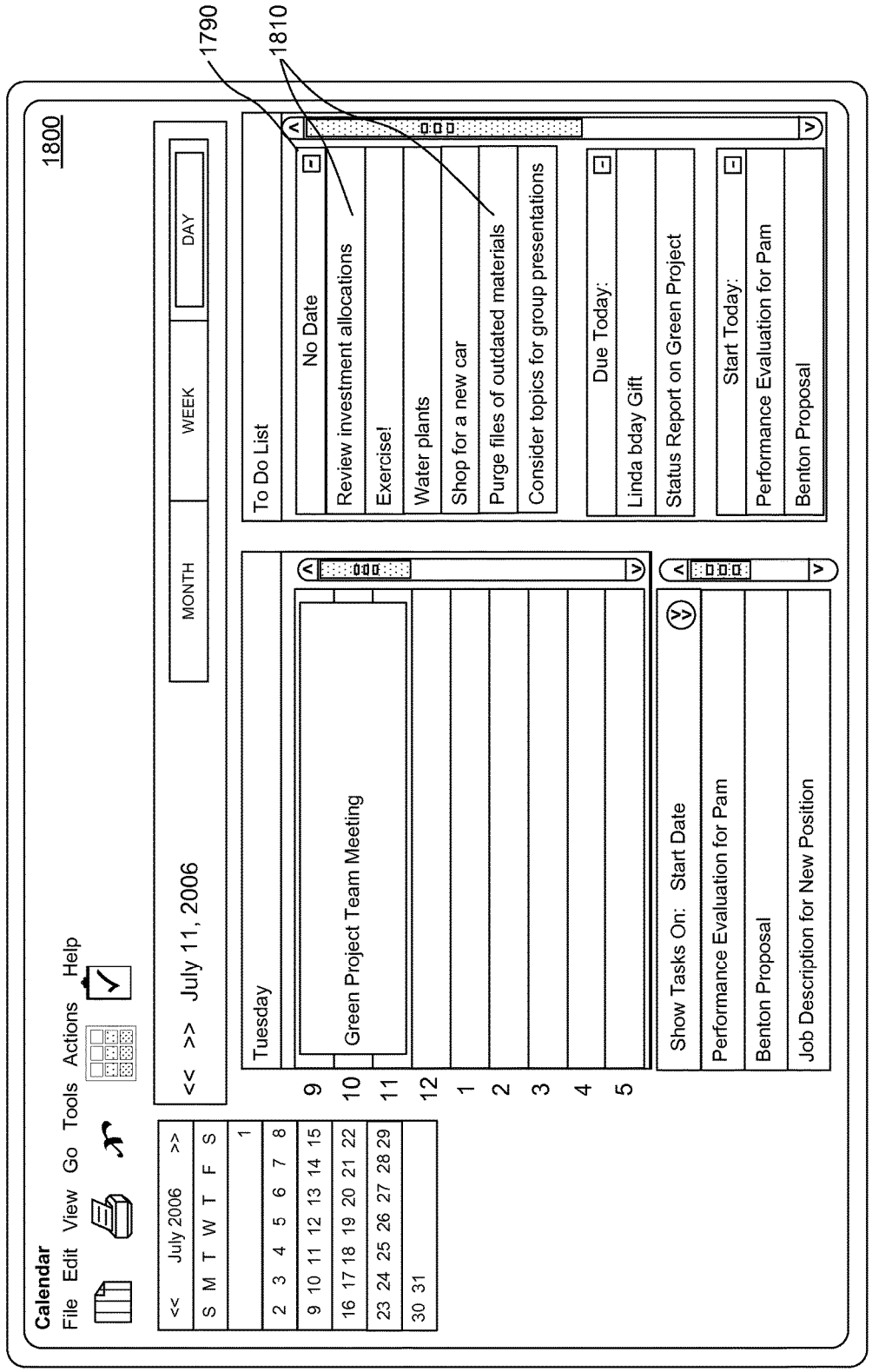

FIG. 18 shows the to do list 1710 with the undated task section 1790 expanded to show a plurality of undated tasks 1810. In the example shown by the screen display 1800 of FIG. 18, the undated tasks are listed first so that, even though the undated tasks do not appear in the task bar, they are listed in a place where the user will be reminded of their existence. As previously described, the undated tasks 1810 may be reminders of ongoing activities or tasks that are not sufficiently important or otherwise appropriate to be assigned start and/or due dates. Nonetheless, undated tasks 1810 can be marked as completed, color coded, linked with appointments, and otherwise managed as are the tasks included in the daily task lists in the task bar.

Figure 19:
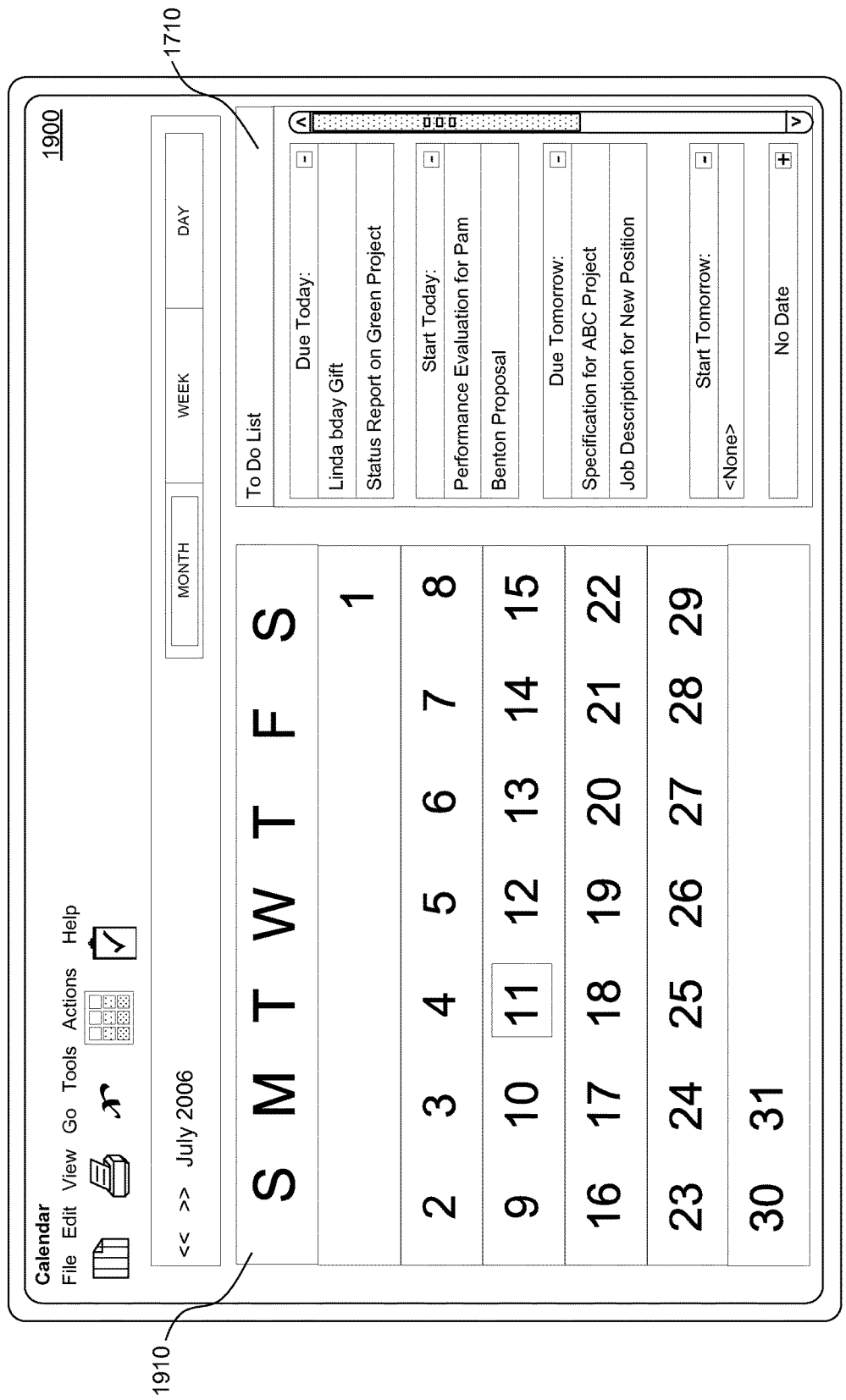
FIG. 19 is a screen display of a calendar and tasks displayed for a month.

A screen display 1900 of FIG. 19 shows a monthly calendar view 1910 showing all the dates in a familiar seven-column presentation. Because the data can become dense in a monthly calendar view, the to do list 1710 provides a vehicle for presenting daily task lists for a number of dates included in a month without presenting a confusingly dense visual display. Again, because the daily tasks are grouped under headings for respective dates, and within those dates classified according to due dates and start dates, the user still has the benefit of viewing a portion of the daily tasks of particular interest to him or her.

Figure 20:
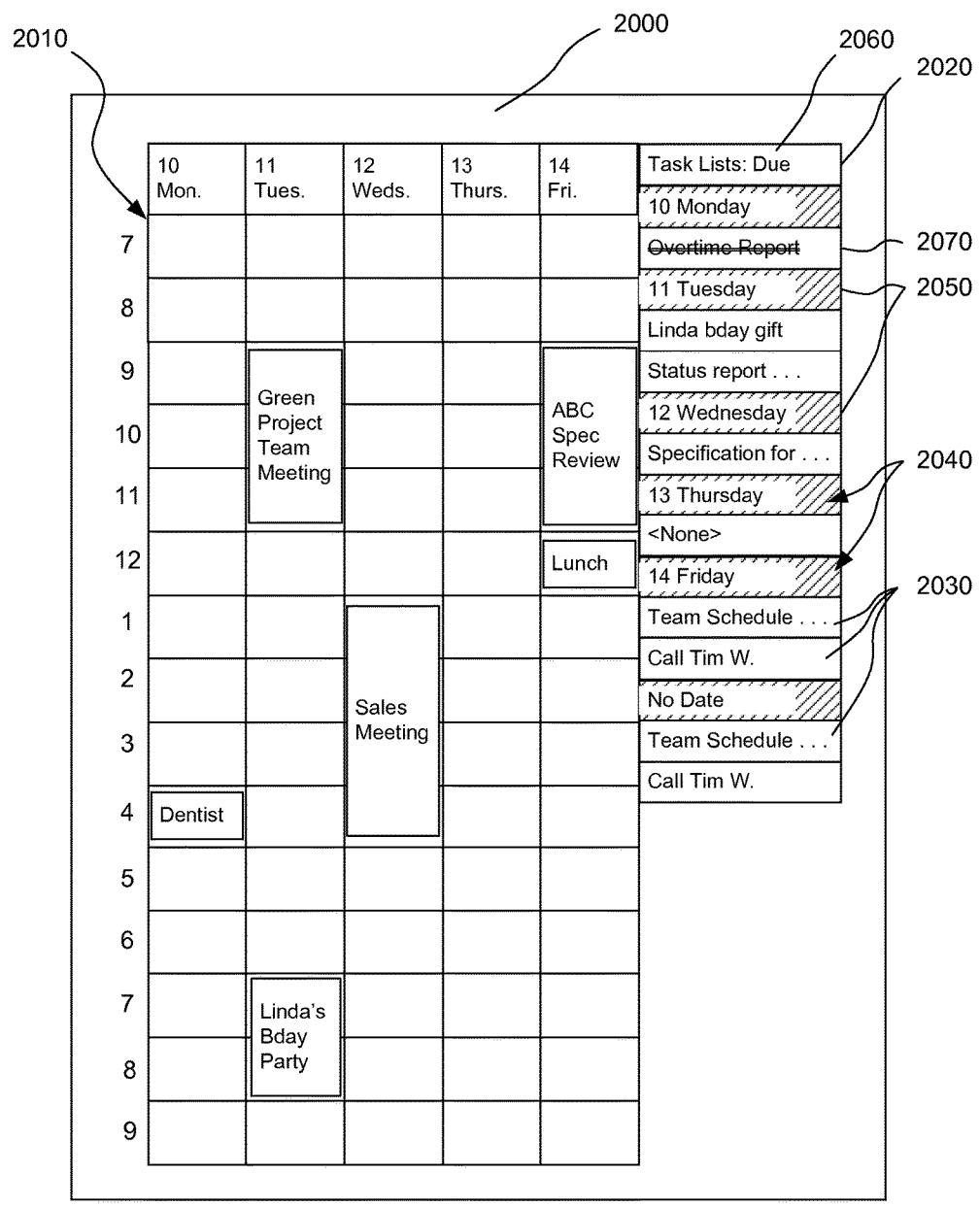
FIG. 20 is a printed schedule displaying appointments and tasks displayed for a range of dates spanning a representative five-day work week.

FIG. 20 represents an exemplary printed page 2000 that may be generated from a calendar system incorporating daily task lists. The printed page 2000 displays schedules of appointments 2010 for a range of dates spanning a five-day workweek. When printing a page, a user may wish to display a complete schedule for the days covered, from early morning through evening because, on a printed page, one cannot scroll to earlier or later times within a day. As a result, it may not be desirable to present the task bar with the tasks below the schedules of appointments 2010 to allow more space for the schedules of appointments 2010 to be displayed.

Accordingly, in one implementation of printing schedules and tasks, the task lists are included in a to do list 2020 in a separate column alongside the schedules of appointments 2010. As previously described with reference to FIGS. 17-19, within the do list 2020, the tasks 2030 are divided up into task lists 2040 divided by headers 2050 indicating those keyed to the indicated dates by due date, start date, or as having been completed on that date. Thus, even when the task lists 2040 are collected in a single daily task list 2020, the tasks 2030 are clearly associated with respective dates appearing in the schedules of appointments 2010.

The daily task list 2020 is presented in a due date view selected by the user, as indicated by the due date indicator 2060 appearing at the top of the daily task list 2020. The user also has chosen a view that shows completed tasks, as indicated by the "Overtime Report" task 2070 being shown as completed. The user alternatively could elect to print a schedule page with the tasks listed by start date, with or without showing completed tasks. Further alternatively, as described with reference to FIGS. 2-13, the daily task list 2020 could be presented with separate due date and start date task lists for each of the dates presented.

Creating Appointments from Tasks and Associating Related Objects

Figure 21:
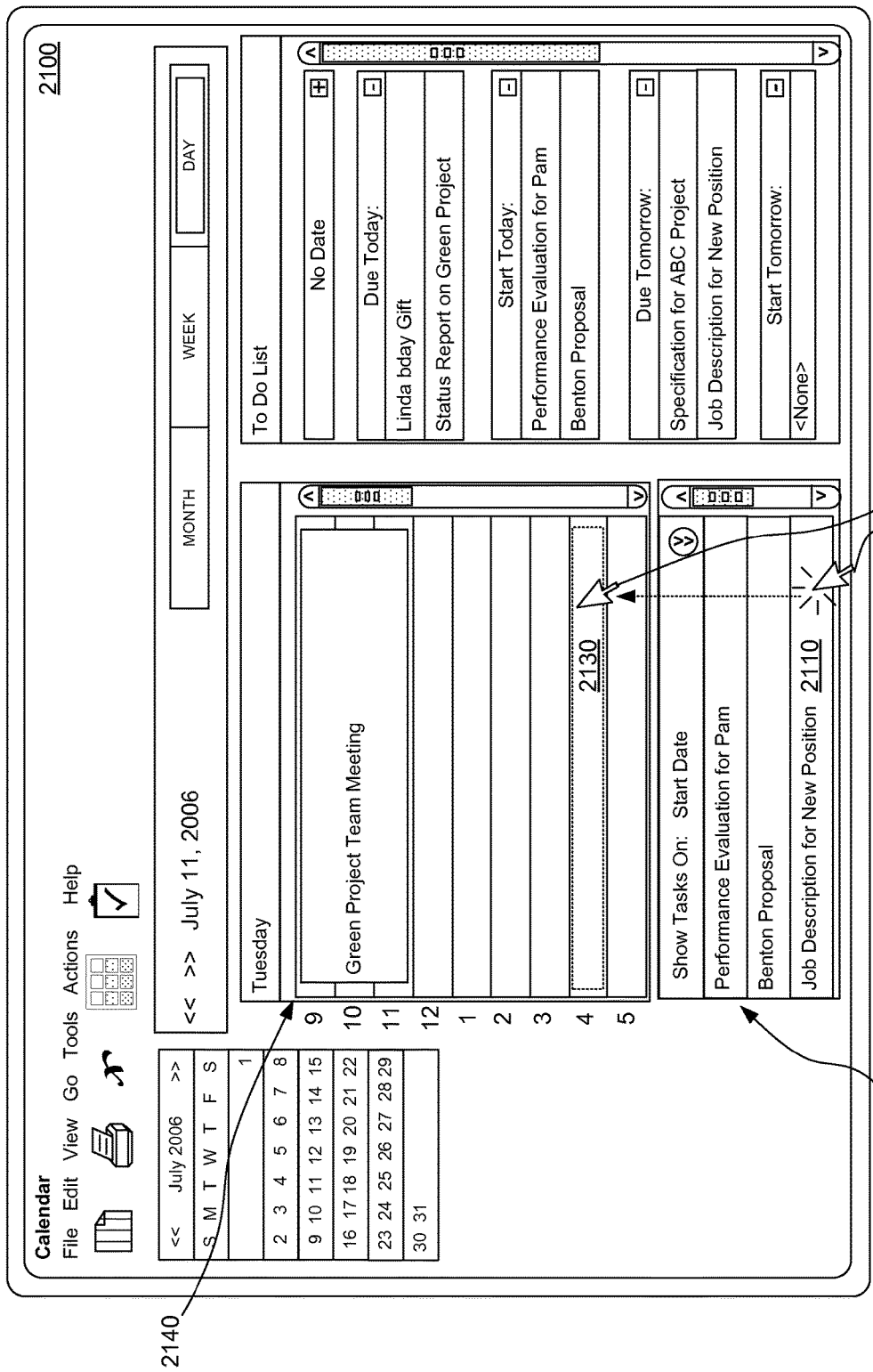
FIGS. 21-23 are screen displays of appointments displayed for a single date with a to do list including a plurality of tasks.

In one implementation, a user can schedule appointments to work on tasks by dragging the tasks to a desired time to work on the task, as illustrated in the screen display 2100 of FIG. 21. The screen display 2100 shows a user manipulating a pointing device to direct a cursor 320 to drag a "Job Description for New Position" task 2110 from a July 11 daily task list 2120 to an open appointment 2130 in the July 11 schedule 2140. In one implementation, dragging a task onto the schedule does not eliminate the task from the daily task list as it might in the case of a task being dragged from one daily task list to another as described with reference to FIGS. 5 and 6. Instead, the task remains present on the daily task list, but an appointment is assigned to work on that task.

In one implementation in which color codes are assignable to tasks and appointments (not shown in FIG. 21), the creation of an appointment by dragging the task 2110 onto the schedule 2140 will result in the same color code automatically being assigned to the newly created appointment 2130. Automatically assigning the same color code provides an immediate visual link to show that the task 2110 and the newly created appointment 2130 are related to the same topic. It should be noted that any other attributes associated with the task will be assigned to the appointment. For example, if a privacy code is associated with the task, the privacy code also will be associated with the appointment. Conversely, if an appointment associated with a privacy code is flagged to create a task for the appointment or otherwise causes the appointment to be displayed as a task, that privacy code also will be associated with the appearance of the task.

In the example represented in the screen display 2100 of FIG. 21, a task is dragged from the daily task list 2120 to the schedule of appointments 2140 for the same date. However, in a calendar view showing schedules of appointments for other dates, the task could be dragged to another date to create an appointment on another date. In one implementation, if the appointment is created on a date before the start date assigned to the task, the respective date may be changed to the date of the appointment. If the appointment is created on a date after the due date, there are multiple possible responses. For example, the due date may be changed, the task may be moved to the daily task list for the date of the appointment and marked as overdue, or the user may be informed of an error in scheduling an appointment to work on a task after its due date. Alternatively, in another implementation, creating appointments in this manner may be independent of the tasks. For example, not changing the dates associated with the tasks ensures that dates associated with the tasks are not unintentionally changed.

Figure 22:
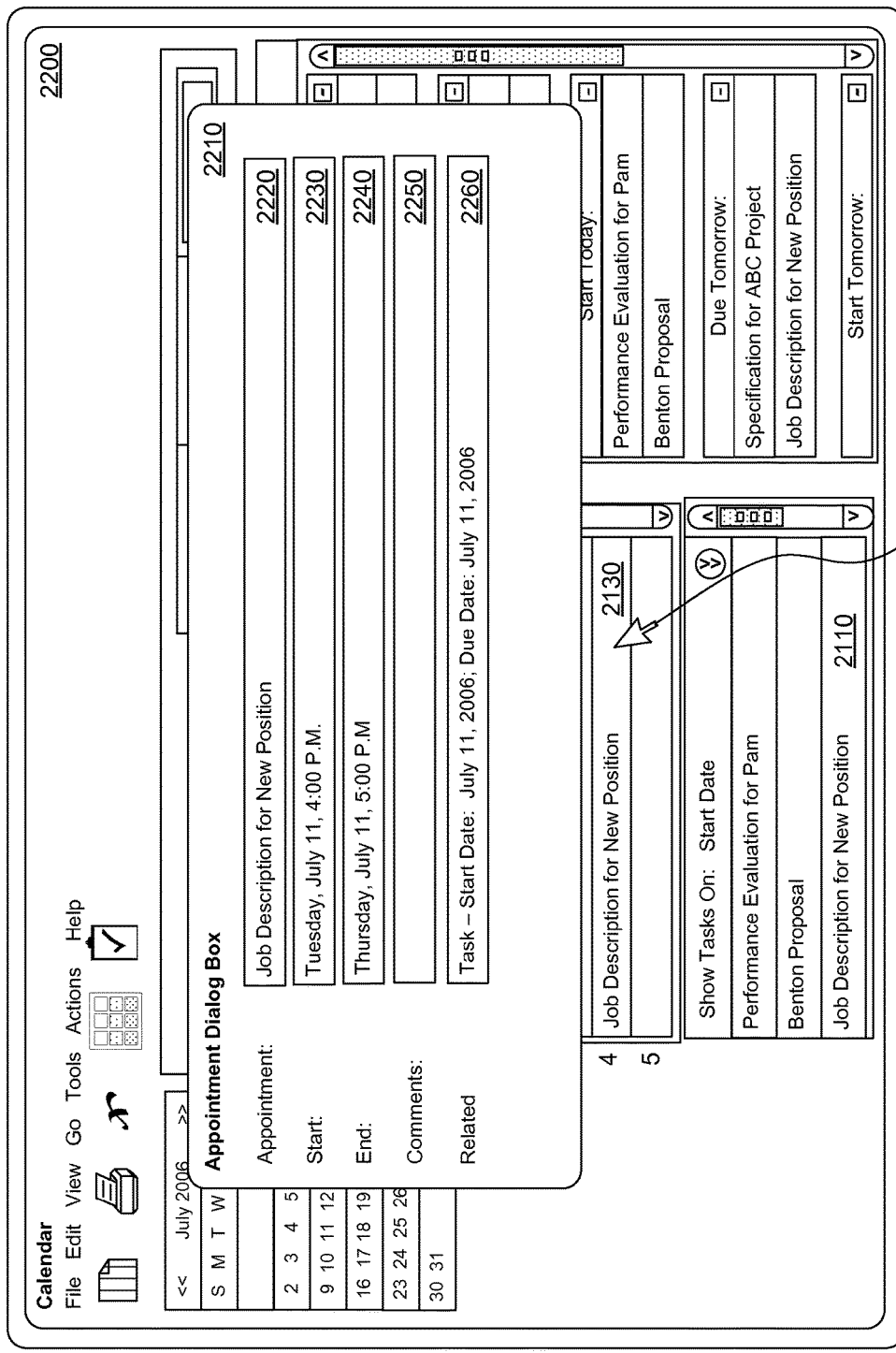

The screen display 2200 of FIG. 22 shows an appointment dialog box 2210 comparable to the task dialog box 810 of FIG. 8. The appointment dialog box 2210 may be invoked by a user by selecting the appointment 2130 and double-clicking the appointment 2130 using a pointing device. The dialog box 2210 also may be invoked by otherwise selecting the appointment 2130 and by pressing appropriate keystrokes or by making a selection from an appropriate menu. The appointment dialog box 2210 includes an appointment field 2220 that, by default, is assigned the same name as the task 2110 from which the appointment 2130 was created. The appointment field 2220 can be used to alter the name of the appointment, if so desired. A start time field 2230 and an end time field 2240 show the default times for the appointment 2130, corresponding to the appointment to which the task was dragged as described with reference to FIG. 21. The appointment dialog box 2210 allows a user to revise these default times, for example, to change the date set for the appointment, to change the start time for the appointment, to change the duration of the appointment by changing the end time, etc. The comments field 2250 allows the user to enter notes about the appointment, as previously described with reference to the comments field 850 of FIG. 8.

Finally, the related field 2260 provides information to show the link to a related object which, in this case, is the task 2210 from which the appointment was created. Thus, if the user completes the task 2110 during the scheduled appointment 2130, the user can easily find the task 2110 to mark it complete. In one implementation, the related field 2260 may include one or more hyperlinks to allow rapid navigation to the related object. This would be particularly convenient if, for example, the appointment was scheduled in a different week or month than the date on which the task 2110 is listed by its due date or start date. Similarly, if additional appointments were associated with the task 2110 and the task was completed during the appointment 2130, it may be desirable to cancel the additional appointments. In addition, if the task and the appointment are associated with a contact, that contact may appear in the related field 2260, providing contact information to communicate with the contact regarding the task to, for example, get more information about the task or report the completion of the task.

Figure 23:
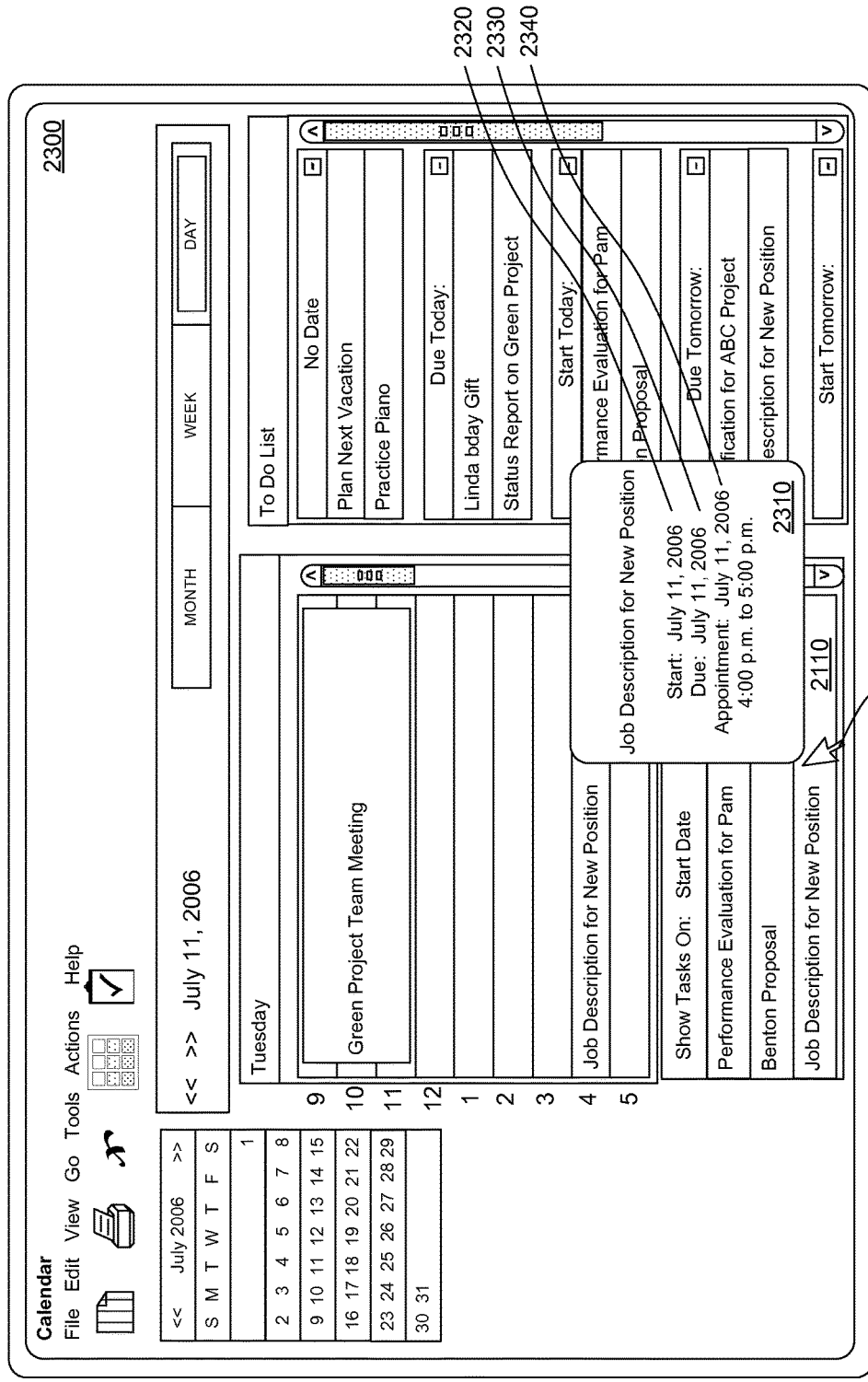

On a similar point, the screen display 2300 of FIG. 23 shows that relating information, such as the information stored in the related field 2260 of FIG. 22, also is associated with the task 2110. Although not shown in FIG. 23, a user could invoke a task dialog box as described with reference to FIG. 8 to view or change information about the task. In addition, as shown in the screen display 2300, by manipulating a pointing device to hover the cursor 320 over the task 2110, a balloon 2310 appears that provides a glimpse of the information associated with the task. The balloon 2310, which also is available for tasks not associated with appointments, for appointments, and other objects, presents information about the start date 2320 for the task 2110, the due date 2330 for the task 2110, the actual completion date for the task 2110 which, as depicted in FIG. 23 may be omitted when the task is not yet completed, and an appointment scheduled 2340 for the task 2110. Thus, just as information about the task 2110 was associated with the appointment 2130, information about the appointment 2130 scheduled is associated with the task 2110. The cross-referencing of the objects allows a user to keep track of all associated objects, whether tasks, appointments, contacts, or other objects such as e-mails, notes, or documents.

Flagging Objects to Cause Objects to Appear in Task Lists

To allow a user to easily incorporate information from objects such as contacts, e-mails, tasks, or appointments into a task list, in one implementation, a user can flag the object to make it appear in the daily task list. In one implementation, flagging a task may cause a task to be created. Alternatively, no new or separate task object may be created; instead, flagging the object merely causes the object to appear in a daily task list. Screen displays 2400 and 2500 of FIGS. 24 and 25, respectively, illustrate flagging an object in order to create a companion task for the flagged object.

Screen display 2400 shows an e-mail inbox 2310 for Thursday, July 13, listing a plurality of incoming e-mails 2320. A "FINANCE REPORTS DUE TODAY!" e-mail 2430 conveys sufficient urgency such that the user elects to create a task to ensure meeting the deadline mentioned in the e-mail 2430. One way to create the task is to "flag" the e-mail. Each of the plurality of incoming e-mails 2420 is associated with a flag field 2440. For example, by manipulating a pointing device to position the cursor 320 on a flag field 2450 associated with the e-mail 2430 and selecting the flag field 2450, the e-mail 2430 is flagged. As a result, the e-mail that was flagged is included in a task list for the user.

Figure 25:
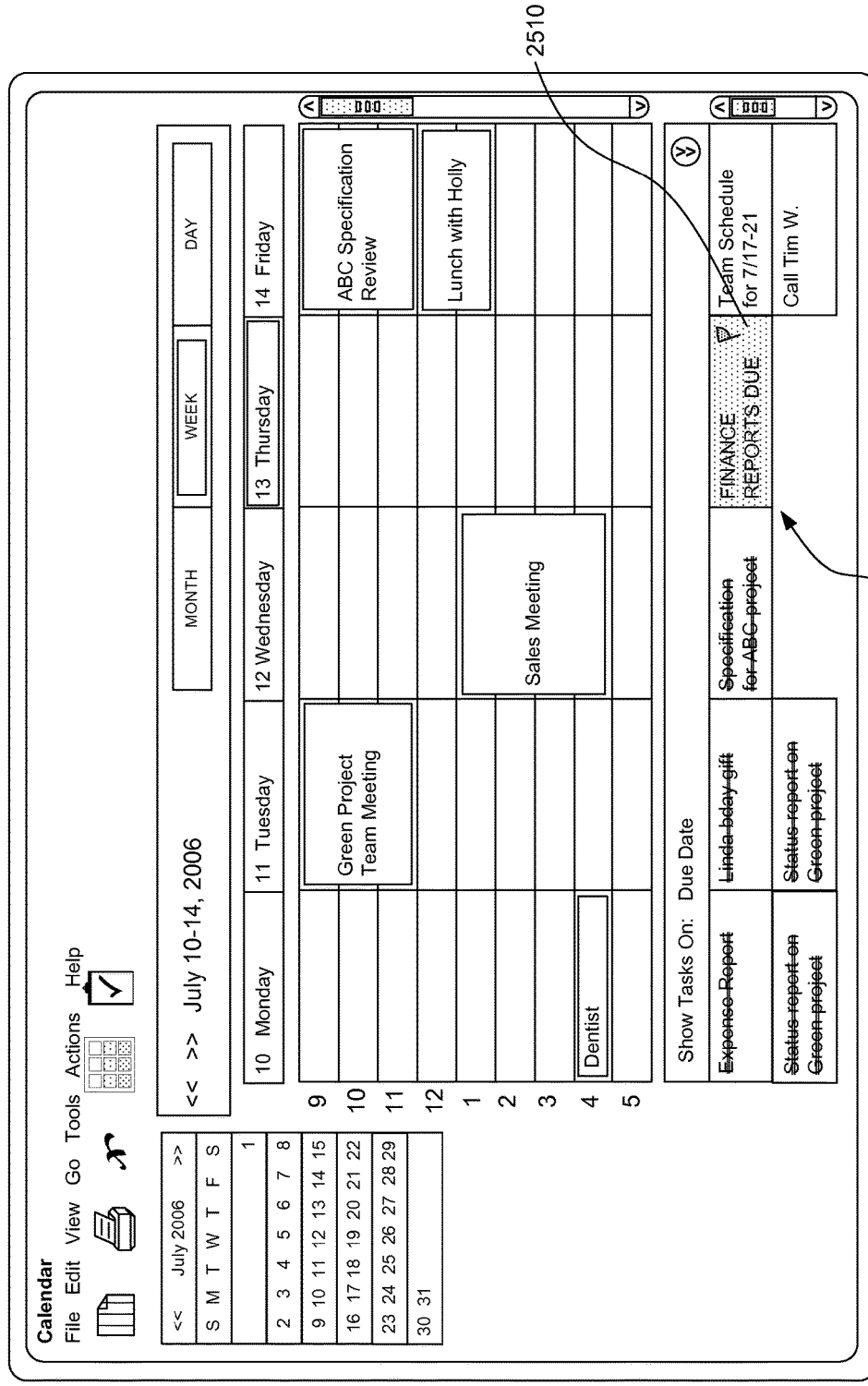

Screen display 2500 of FIG. 25 shows a calendar view for a five-day workweek that includes Thursday, July 13, the date for which the e-mail 2430 was flagged. As a result of the e-mail 2430 being flagged, a "FINANCE REPORTS DUE" task 2510 appears in the July 13 daily task list 2520. The task bar 230 reflects that the daily task lists are viewed according to due date. In one implementation, flagging a task assigns a default start date and due date for the new task 2510 on the date for which the task 2510 was flagged, as is further described below with reference to FIG. 29. As previously described, the parameters of the task 2510, including start dates and due dates, can be changed by dragging the task, invoking a dialog box for the task, or by using other appropriate techniques. Similarly, an appointment could be created for the task 2510 by dragging the task to a time on a schedule of appointments.

Identifying Tasks to be Presented in a Task List

Figure 26:
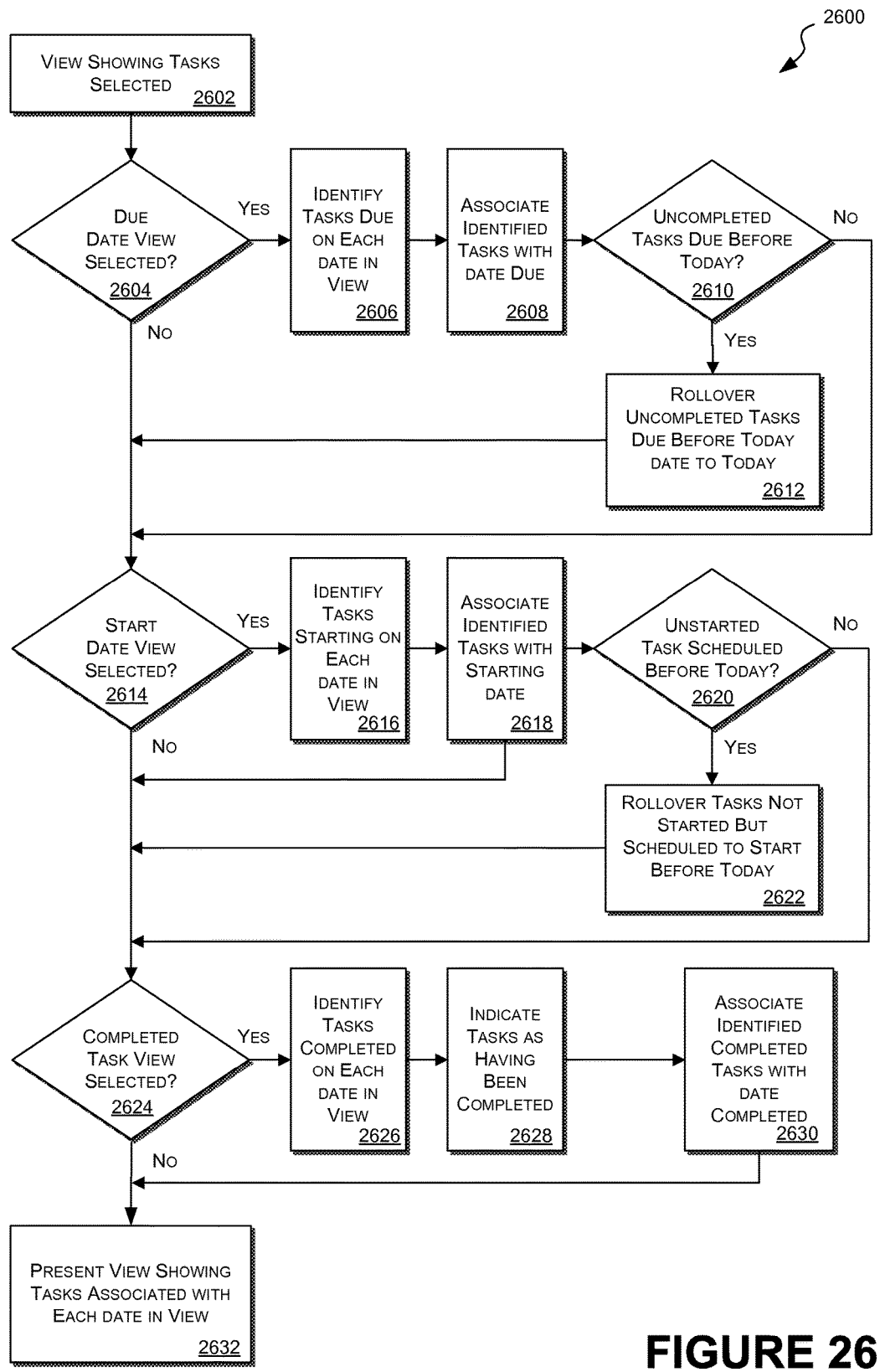
FIG. 26 is a flow diagram illustrating an exemplary process for identifying tasks to be included in daily task lists.

FIG. 26 presents a flow diagram 2600 of an implementation for identifying tasks to be presented in a task list. At 2602, a calendar view is selected. In one implementation, as previously described, tasks are presented in task lists as part of the calendar view. Thus, selection of a calendar view initiates identification of the tasks to be displayed.

At 2604, it is determined if the task list is set to a due date view. The user may select a due date view, or it may be a default setting. If it is determined at 2604 that a due date view has not been selected, the flow diagram 2600 proceeds to 2614. However, if it is determined at 2604 that a due date view is selected, at 2606 tasks due on each day in the calendar view are identified. Which dates are included in the calendar view depends on whether a daily, weekly, monthly, or other calendar view is selected. At 2608, the identified tasks are associated with the date each task is due.

At 2610, it is determined if there are any uncompleted tasks that are due or scheduled to have been completed before today's date. If any such overdue tasks are identified at 2612, in one implementation, the overdue tasks are rolled over and associated with today's date. In this fashion, as previously described, overdue tasks continue to be presented to the user so that they are not overlooked. Once it is determined at 2610 that there are no overdue tasks to be rolled over, or at 2612 overdue tasks have been rolled over, the flow diagram proceeds to 2624.

In one implementation, the calendar view will present either a due date view or a start date view. Accordingly, only one determination would be made about whether a due date view or a start date view is selected, instead of including both a due date view determination at 2604 and a start date view determination at 2614. Thus, for example, if it was determined that a due date view was selected, once the tasks were identified and associated by due date, the flow diagram would proceed to the due task view determination at 2620. However, also as previously described, it may be desirable to include daily task lists collecting both tasks to be completed on a particular date and tasks to be started on a particular date, as was shown in the to do list 1710 of FIG. 17. Moreover, a user may elect not to have either sets of tasks displayed, either because the user wishes to view no tasks on the calendar view or, as described below, the user wishes to view only completed tasks. As a result, separate due date and start date determinations may be included, as in the flow diagram 2600.

At 2614, it is determined if the calendar is set to a start date view, as a matter of user selection or a default setting. If it is determined that a start date view has not been selected, the flow diagram 2600 proceeds to 2624. However, if it is determined at 2614 that a start date view is selected, at 2616, tasks assigned to start on each day in the calendar view are identified. Again, which dates are included in the calendar view depends on whether a daily, weekly, monthly, or other calendar view is selected. At 2618, the identified tasks are associated with the date each task is to be started. Once the tasks are associated, the flow diagram 2600 proceeds to 2620. At 2620, it is determined if there are any tasks scheduled to start before today's date that have not been marked as having been started or already have been completed. If not, the flow diagram 2600 proceeds to 2624. However, if it is determined at 2620 that there are tasks scheduled to start before today's date that have not been marked as having been started, at 2622, those tasks are rolled over to appear on the task list for today.

At 2624, it is determined if a completed task view is selected. If it is determined at 2624 that a completed task view has not been selected, the flow diagram 2600 proceeds to 2632. However, if it is determined at 2624 that a completed task view has been selected, at 2626 tasks that have been completed on each day in the calendar view are identified. Again, which dates are included in the calendar view depends on whether a daily, weekly, monthly, or other calendar view is selected. At 2628, the completed tasks are indicated as having been completed, such as by the use of a strikethrough mark over the task name as previously described. At 2630, the completed tasks are associated with the date each was completed. The flow diagram then proceeds to 2632.

At 2632, the view showing tasks associated with each date in the view are presented. An exemplary process for displaying the tasks is described with reference to FIG. 27.

Presenting Tasks in a Task List

Figure 27:
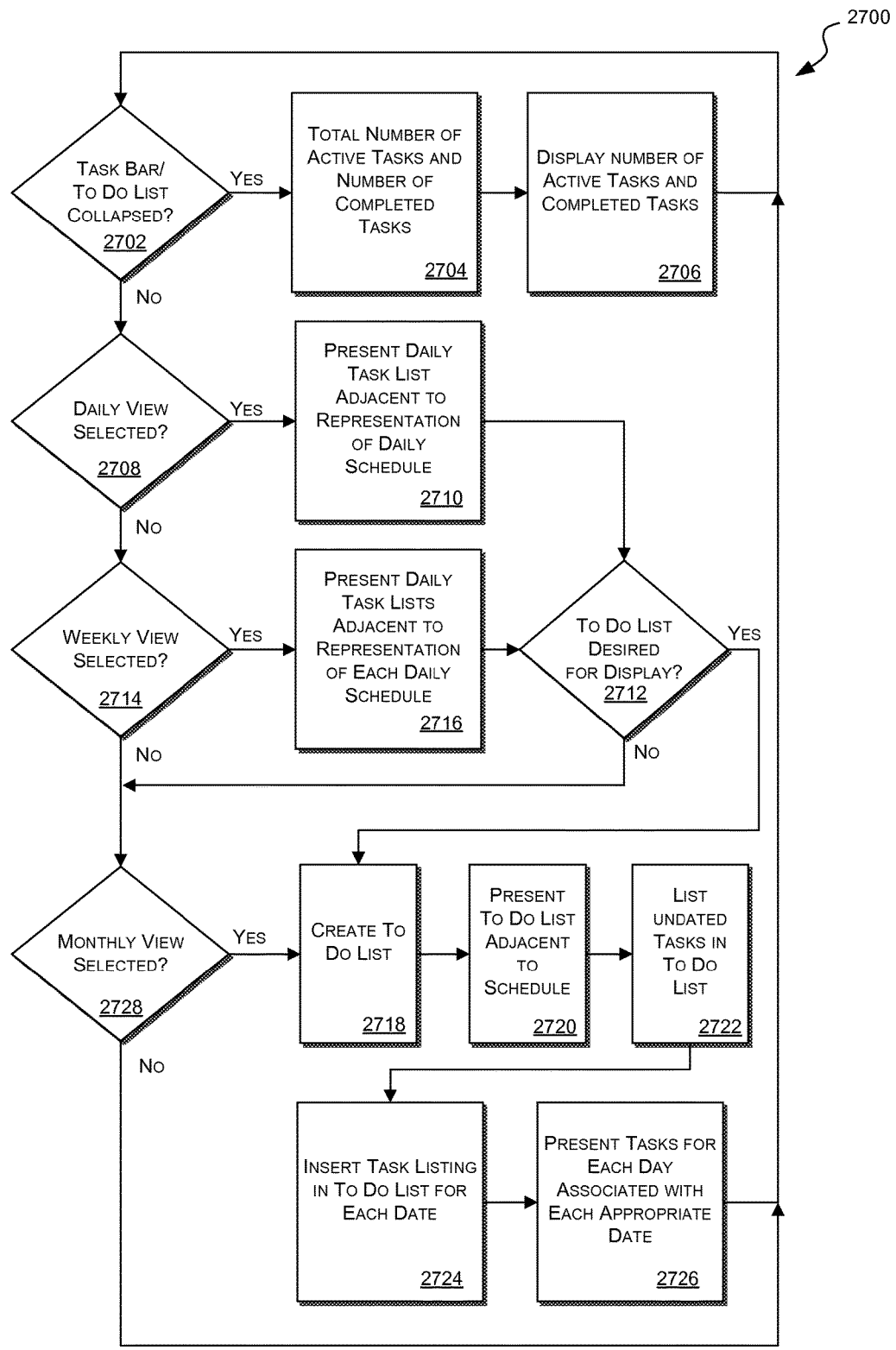
FIG. 27 is a flow diagram illustrating an exemplary process for presenting daily task lists.

FIG. 27 presents a flow diagram 2700 of an implementation for presenting tasks in task lists. The flow diagram illustrates a process that operates as a continuous loop. According to implementations of a daily task view, a user can switch between calendar views, and the tasks presented will be adjusted depending on the view selected.

At 2702, it is determined if the task bar, which may be presented by itself or as part of a to do list as previously described, is collapsed so that the actual tasks will not be presented. If it is determined at 2702 that the task bar is not collapsed, the flow diagram 2700 proceeds to 2708. However, if it is determined at 2702 that the task lists have been collapsed, at 2704, the total number of active tasks and number of completed tasks is totaled. At 2706, the number of active tasks and completed tasks is then displayed, for example, in a bar representing the task lists.

At 2708, it is determined if a daily view is selected. If it is determined at 2708 that a daily view has not been selected, the flow diagram 2700 proceeds to 2714. However, if it is determined at 2708 that a daily view has been selected, at 2710 the daily task list is presented adjacent to a representation of the daily schedule. Whether tasks are displayed according to due date or start date, or whether tasks marked as completed are displayed is determined by user or default selections as described with reference to FIG. 26. In one implementation, whether the task bar is displayed below, above, or alongside the representation is selectable by a user. Once the task list is displayed at 2710, at 2712 it is determined if a to do list is also desired for display. As previously described, whether or not a task list is displayed with the daily schedule, a to do list including undated tasks or tasks for other dates also may be displayed.

At 2714, it is determined if a weekly view is selected. If it is determined at 2714 that a weekly view has not been selected, the flow diagram 2700 proceeds to 2724. However, if it is determined that at 2714 that a weekly view is selected, at 2716 daily task lists for each of the dates are presented adjacent to the representation of each respective daily schedule. As previously described, these daily task lists may be part of a task bar. In addition, the daily task lists may be presented below, above, or alongside the representation of the daily schedule each of the respective dates. Once the task lists are displayed at 2716, at 2712 it is determined if a to do list is also desired for display.

At 2712, if it is determined that a to do list is not desired, the flow diagram 2700 proceeds to 2724. However, if it is determined at 2712 that a to do list is desired, at 2718 a to do list is created for display. At 2720, in one implementation, the to do list is presented adjacent to a representation of a portion of the user's calendar, as previously described. At 2722, in one implementation, first any undated tasks are listed in the in the to do list. At 2724, in one implementation, task listings for each date are inserted in the task list. Thus, as previously described, in addition to the undated tasks, a user can view tasks to be completed or started for other dates. At 2726, the task lists are presented associated with each appropriate date. In other words, the lists may be presented under headings indicating the date with which each is assigned, to differentiate the tasks from one another. Once the to do list is presented, the flow diagram proceeds to 2702 to determine what view is selected for presentation.

At 2728, it is determined if a monthly view has been selected. If it is determined at 2728 that a monthly view has not been selected, the flow diagram proceeds to 2702 to determine what view is selected for presentation. However, if it is determined at 2728 that a monthly view has been selected, at 2718, a to do list is created. In one implementation, because there may not be appropriate room for individual daily task lists to be associated with each date presented in a monthly view, it is assumed that a to do list should be presented in the monthly view. However, other implementations may request user selection of a to do list, or suppress the to do list for the monthly view.

Dragging Tasks

Figure 28:
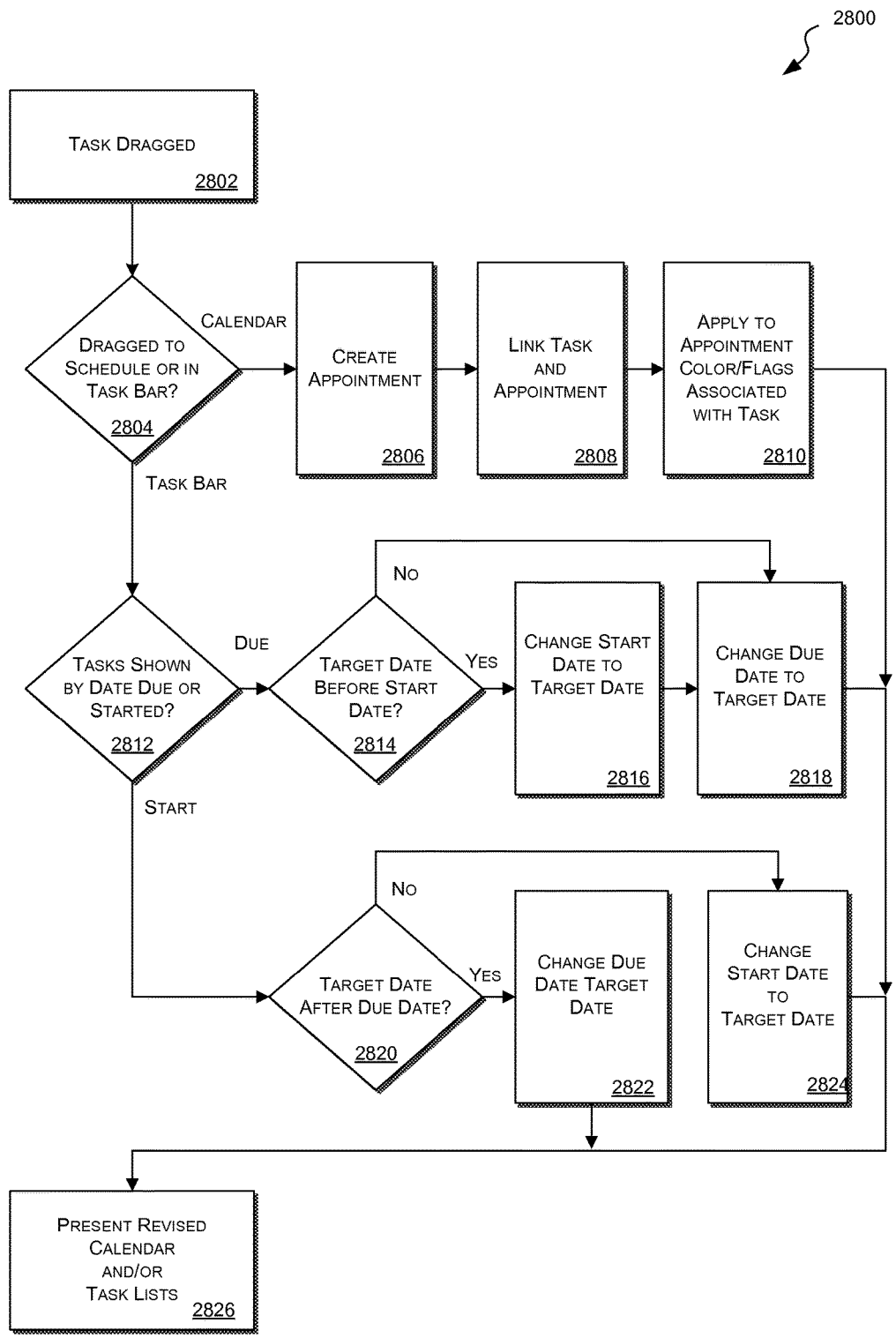
FIG. 28 is a flow diagram illustrating an exemplary process providing for the dragging of tasks to a schedule of appointments or between task lists.

FIG. 28 presents a flow diagram 2800 of an implementation of a facility for dragging tasks onto calendar views. At 2802, a task is dragged. At 2804, it is determined if the task has been dragged to a schedule of appointments for a particular date or to another location in the task bar. If it is determined at 2804 that the task has been dragged to another location in the task bar, the flow diagram 2800 proceeds to 2812. However, if it is determined at 2804 that the task has been dragged to a schedule, at 2806, an appointment is created at the time on the schedule to which the task has been dragged. At 2808, the task and the appointment are linked as previously described, thereby allowing a user viewing the detail of a task to see the detail of a scheduled appointment and vice versa. At 2810, any color codes or flags associated with the task also are applied to the appointment to visually indicate the commonality between the task and the appointment. Once the color codes or flags are applied at 2810, the flow diagram proceeds to 2826.

At 2812, which is reached when a user drags a task within the task bar, it is determined if the tasks are shown by due dates or start dates. If it is determined at 2812 that the tasks are shown by start date, the flow diagram proceeds to 2820. However, if it is determined at 2812 that the tasks are shown by due date, at 2814 it is determined if the target date to which the task is being dragged is before the currently assigned start date. If not, the flow diagram 2800 proceeds to 2818. However, if it is determined at 2814 that the target date is before the start date, the start date is changed to the target date, because it would not make sense for the start date to precede the due date. At 2818, the due date is changed to the target date to reflect the change in due date caused by the user dragging the task. In one implementation, dragging a task will not change a due date, and if the task is dragged beyond the current due date, the task will be identified as overdue. Once the dates are changed as desired at 2818, the flow diagram 2800 proceeds to 2826.

At 2820, which is reached if it is determined at 2812 that the tasks are shown by start date, it is determined if the target date is after the due date. If it is determined at 2820 that the target date is not after the due date, the flow diagram proceeds to 2824. However, if it is determined at 2820 that the target date is after the due date, at 2822 the start date is changed to the target date, because it would not make sense for the due date to precede the start date. Nonetheless, in one implementation, dragging a task will not change a due date, and if the task is dragged beyond the current due date, the task will be identified as overdue. At 2824, the start date is changed to the target date. Once the start date is changed, the flow diagram 2800 proceeds to 2826.

At 2826, the revised calendar and/or task lists are presented. If a task has been dragged to a schedule of appointments, the calendar will be changed as described to reflect the newly created appointment. If a task has been dragged to another task list, the task lists are changed to indicate the change.

Flagging Objects to Create Tasks

Figure 24:
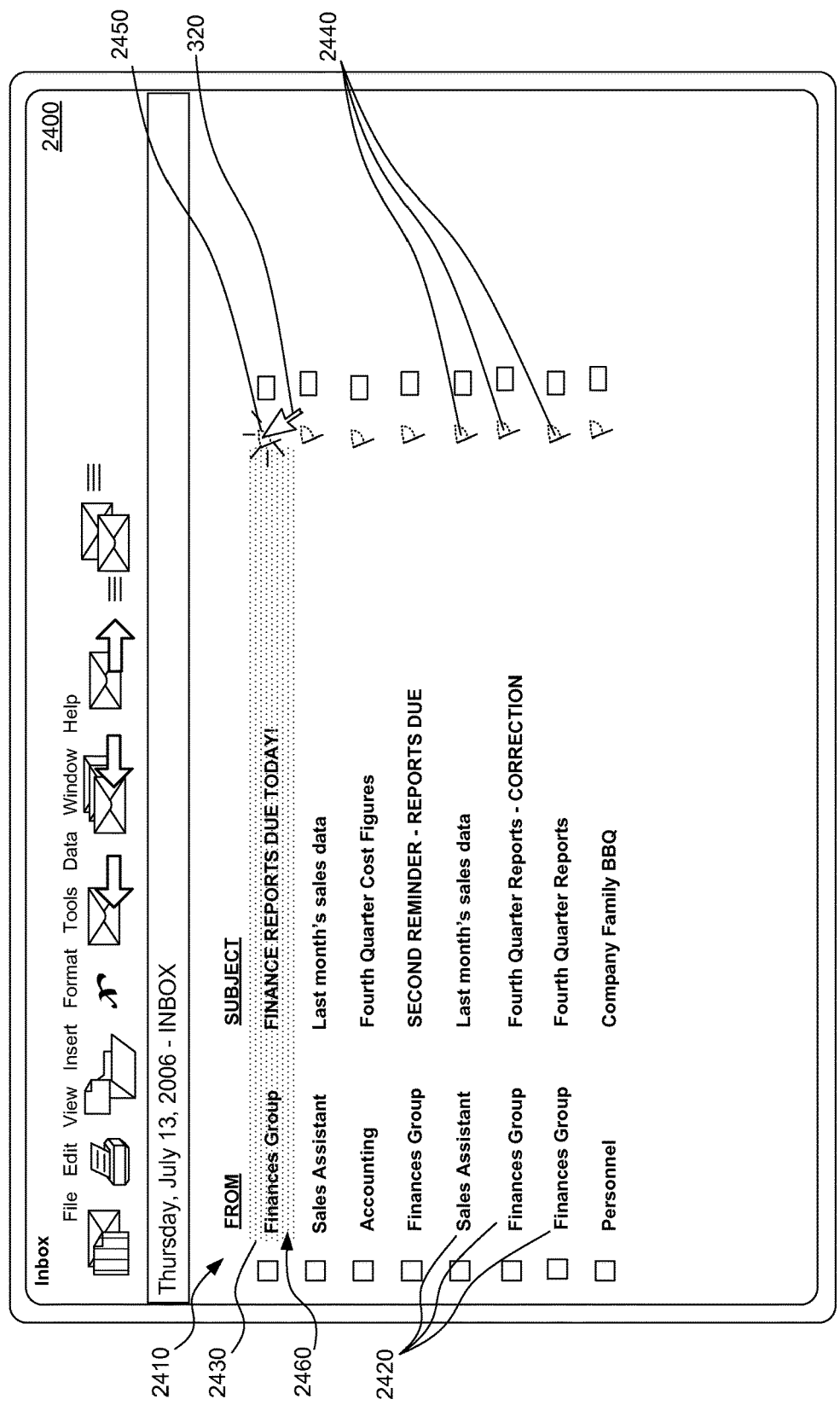
FIG. 24 is a screen display of an e-mail inbox.
Figure 29:
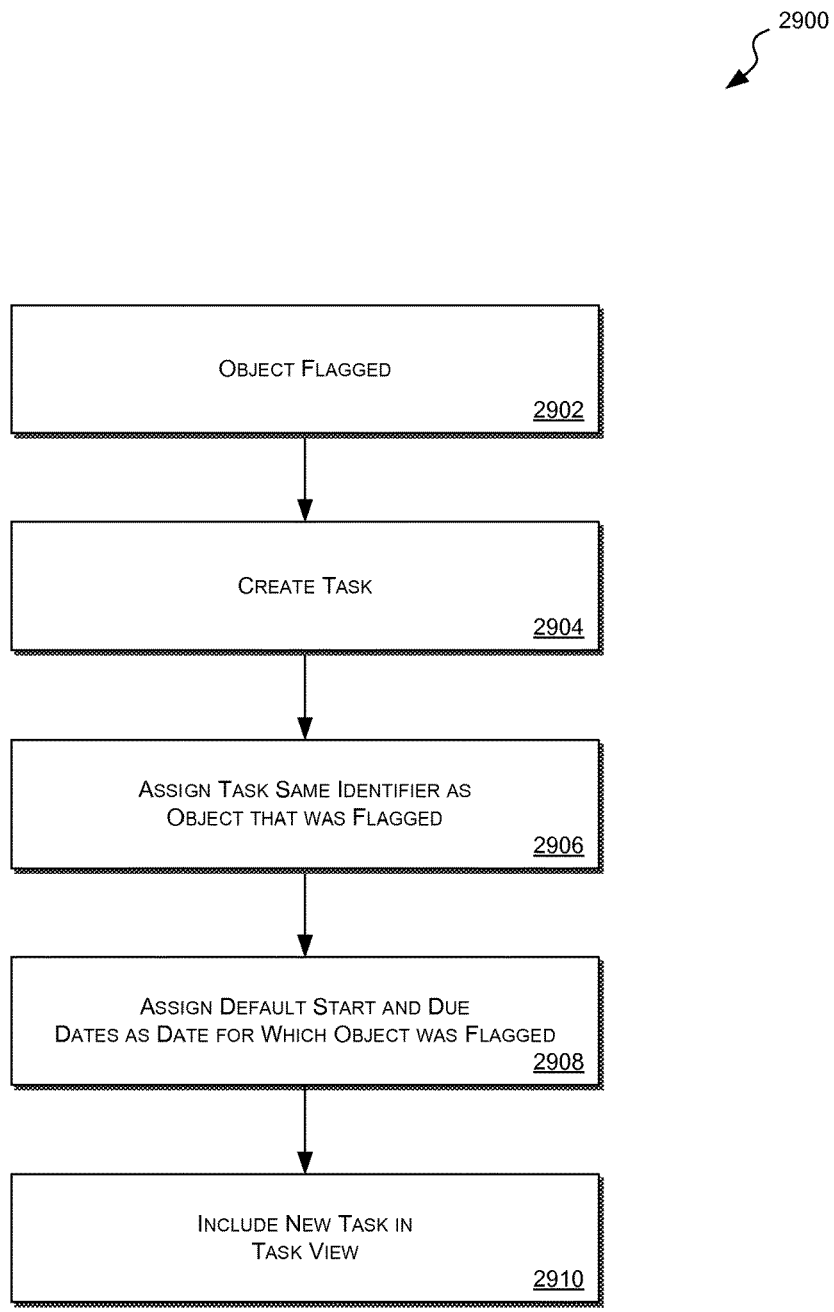
FIG. 29 is a flow diagram illustrating an exemplary process of creating a task for a flagged object.

FIG. 29 presents a flow diagram 2900 of an implementation of a facility for creating tasks when a user flags another object, such as an e-mail or a contact entry as previously described with reference to FIGS. 24 and 25. As previously described, flagging an object can result in a flagged object being displayed along with a list of tasks on the date for which the object was flagged. In this implementation, because the original item is available to the daily task list, all color codes, flags, and other attributes may be shown in the presentation of the task on the daily task list. Alternatively, flagging an object can result in a new, distinct task entry being created for the flagged object. FIG. 29, for example, describes a process by which a task is created when an object is flagged.

At 2902, an object is flagged, for example, by manipulating a pointing device to select a flag marker associated with the object as described with reference to FIG. 24. At 2904, a task is created. At 2906, the task is assigned the same identifier as the object that was flagged, indicating the task has been created to address the object that was flagged. The task also may be marked with a flag symbol and/or assigned a color code assigned to the object that was flagged to illustrate the relationship of the newly created task with the object and/or topic of the flagged object.

At 2908, the date the object was flagged is assigned as the default start date and due date for the task. As previously described, dialog boxes or other tools can be used to change the start or due dates, or other attributes of the task. However, in one implementation, for ease of creation, default start and due dates are set to a date for which the object was flagged. In one implementation, when a user flags an object, the user is presented with a dialog box or menu (not shown) allowing the user to choose today, tomorrow, this week, next week, or a custom selection of dates to be the start date and due date for the flagged item. For example, if a user flags an item for this week, the start date is set for two days from the current date, and the due date is set for the last day of the work week. On the other hand, if the user flags the item for next week, the start date is set for the first day of the following work week, and the due date is set for the last day of the next work week. At 2910, the newly created task is presented in the task view, to manifest the task created for the flagged object.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computing device for a calendar system incorporating daily task lists, the computing device configured to:
   receive user input selecting a range of dates;
   display a calendar view corresponding to the selected range of dates;
   group a plurality of tasks based at least on dates associated with the plurality of tasks;
   display a visual representation of one or more schedules of appointments within the calendar view for each date within the selected range of dates, wherein each of the appointments comprises a start time and an end time;
   display a visual representation of tasks within a task bar along with the appointments within the calendar view, wherein each of the tasks comprises a date, wherein the task bar includes a plurality of daily task lists corresponding to each date of the selected range of dates within the calendar view, and wherein each daily task list displays at least one graphically interactive task indicator, wherein the task indicator indicates a task, and wherein the task indicator is selectable through user interaction and further indicates a date matching the corresponding date within the calendar view;
   within a single view comprising the calendar view and the task bar, simultaneously display visual representation of a "to do" list separately from the calendar view and the task bar, wherein the tasks displayed in the task bar are incorporated into the "to do" list and are grouped according to which tasks are to be completed each day of the selected range of dates and overdue tasks being automatically rolled over to a next date;
   enable the task indicator to be dragged from a first daily task list with a first date to a second daily task list with a second date through user interaction to change a date associated with the task indicated by the task indicator from the first date to the second date; and in response to the changed date of the task indicator, update a displayed position of the incorporated task on the "to do" list from the first date to the second date.

2. The computing device of claim 1 further configured to display the task bar above the appointments within the calendar view.

3. The computing device of claim 1 further configured to display the task bar below the appointments within the calendar view.

4. The computing device of claim 1 further configured to enable marking of tasks as completed in both the daily task list and the "to do" list.

5. The computing device of claim 1 further configured to display completed tasks in both the daily task list and the "to do" list.

6. The computing device of claim 1 further configured to display headings within the "to do" list based on the due date of each task, wherein one of the headings relates to tasks having no assigned due date.

7. The computing device of claim 1 further configured to:
receive additional user input selecting a second range of dates; and
update the display of the calendar view and the task bar to display appointments and daily task lists corresponding to the second range of dates while maintaining the display of the plurality of tasks within the "to do" list.

8. The computing device of claim 1 further configured to display the "to do" list, the calendar view and the task bar concurrently within the single view.

9. The computing device of claim 1, wherein the dates associated with the plurality of tasks are start dates of the plurality of tasks, and wherein the date associated with the task is a start date of the task.

10. The computing device of claim 1, wherein the dates associated with the plurality of tasks are due dates of the plurality of tasks, and wherein the date associated with the task is a due date of the task.

11. A computer-readable storage device, not including a propagated signal, which stores computer-executable instructions that when executed perform actions for a calendar system incorporating daily task lists, the actions comprising:
receiving user input selecting a range of dates;
displaying a calendar view corresponding to the selected range of dates;
associating a task with a date;
displaying visual representation of one or more schedules of appointments within the calendar view for each date within the selected range of dates, wherein each of the appointments comprises a start time and an end time;
displaying visual representation of tasks within a task bar along with the appointments within the calendar view, wherein each of the tasks comprises a date, wherein the task bar includes a plurality of daily task lists corresponding to each date of the selected range of dates within the calendar view, and wherein each daily task list displays at least one graphically interactive task indicator, wherein the task indicator indicates a task, and wherein the task indicator is selectable through user interaction and further indicates a date matching the corresponding date within the calendar view;
within a single view comprising the calendar view and the task bar, simultaneously displaying visual representation of a "to do" list separately from the calendar view and the task bar, wherein the tasks displayed in the task bar are incorporated into the "to do" list and are grouped according to which tasks are to be completed each day of the selected range of dates and overdue tasks being automatically rolled over to a next date;
enabling the task indictor to be dragged from a first daily task list with a first date to a second daily task list with a second date through user interaction to change a date associated with the task indicated by the task indicator from the first date to the second date; and
in response to the changed date of the task indicator, updating a displayed position of the incorporated task on the "to do" list from the first date to the second date.

12. The computer-readable storage device of claim 11, further comprising displaying the task bar above the appointments within the calendar view.

13. The computer-readable storage device of claim 11, further comprising displaying the task bar below the appointments within the calendar view.

14. The computer-readable storage device of claim 11, further comprising marking tasks as completed in both the daily task list and the "to do" list.

15. The computer-readable storage device of claim 11, further comprising displaying completed tasks in both the daily task list and the "to do" list.

16. The computer-readable storage device of claim 11, further comprising displaying headings within the "to do" list based on the date associated with each task, wherein the date associated with each task is a due date, and wherein one of the headings relates to tasks having no assigned due date.

17. The computer-readable storage device of claim 11, further comprising:
receiving additional user input selecting a second range of dates; and
updating the display of the calendar view and the task bar to display appointments and daily task lists corresponding to the second range of dates while maintaining the display of the plurality of tasks within the "to do" list.

18. A computer-implemented method for a calendar system incorporating daily task lists, the method comprising:
executing, by a computer, the steps of:
receiving user input selecting a range of dates;
displaying a calendar view corresponding to the selected range of dates;
grouping a plurality of tasks based on dates of the plurality of tasks;
displaying visual representation of one or more schedules of appointments within the calendar view for each date within the selected range of dates, wherein each of the appointments comprises a start time and an end time;
displaying visual representation of tasks within a task bar along with the appointments within the calendar view, wherein each of the tasks comprises a date, wherein the task bar includes a plurality of daily task lists corresponding to each date of the selected range of dates within the calendar view, and wherein each daily task list displays at least one graphically interactive task indicator, wherein the task indicator indicates a task, and wherein the task indicator is selectable through user interaction and further indicates a date matching the corresponding date within the calendar view;
within a single view comprising the calendar view and the task bar, simultaneously displaying visual representation of a "to do" list separately from the calendar view and the task bar, wherein the tasks displayed in the task bar are incorporated into the "to do" list and are grouped according to which tasks are to be completed each day of the selected range of dates and overdue tasks being automatically rolled over to a next date;

enabling the task indictor to be dragged from a first daily task list with a first date to a second daily task list with a second date through user interaction to change a date associated with the task indicated by the task indicator from the first date to the second date; and in response to the changed date of the task indicator, updating a displayed position of the incorporated task on the "to do" list from the first date to the second date.

19. The computer-implemented method of claim 18, the steps further comprising displaying the task bar above the appointments within the calendar view.

20. The computer-implemented method of claim 18, the steps further comprising:

receiving additional user input selecting a second range of dates; and updating the display of the calendar view and the task bar to display appointments and daily task lists corresponding to the second range of dates while maintaining the display of the plurality of tasks within the "to do" list.

* * * * *